(12) United States Patent
Aono

(10) Patent No.: US 6,573,899 B2
(45) Date of Patent: Jun. 3, 2003

(54) MORPHING PROCESSING APPARATUS, METHOD, STORAGE MEDIUM, PROGRAM TRANSMISSION APPARATUS, AND ANIMATION CREATION APPARATUS

(75) Inventor: Masaki Aono, Yokohama (JP)

(73) Assignee: International Business Machines Corporation, Armonk, NY (US)

( * ) Notice: Subject to any disclaimer, the term of this patent is extended or adjusted under 35 U.S.C. 154(b) by 224 days.

(21) Appl. No.: 09/734,137

(22) Filed: Dec. 11, 2000

(65) Prior Publication Data

US 2001/0007451 A1 Jul. 12, 2001

(30) Foreign Application Priority Data

Dec. 13, 1999 (JP) .......................................... 11-353720

(51) Int. Cl.[7] .............................................. G06T 15/00
(52) U.S. Cl. ...................................... 345/473; 345/467
(58) Field of Search ................................ 345/473, 474, 345/475, 619, 629, 630, 419, 467, 468, 469, 470, 471; 386/4, 5

(56) References Cited

U.S. PATENT DOCUMENTS 5,448,694 A * 9/1995 Wada et al. ................ 345/473
6,441,827 B1 * 8/2002 Hori et al. .................. 345/629

* cited by examiner

Primary Examiner—Phu K. Nguyen
(74) Attorney, Agent, or Firm—Andrew J. Wojnicki, Jr.; James E. Murray

(57) ABSTRACT

Morphing is performed without self-intersection in a vector space, for the outlines for various types and shapes of figures. The morphing is performed by apparatus containing an outline extractor, for receiving two target figures for the morphing process and for extracting a set of outlines for each of the target figures; an outline tree generator and an outline tree arrangement unit, for retaining one specific outline of each of the two sets of outlines and for deleting the other outlines; an outline editor, for performing a smoothing process for the two outlines for the target figures that are retained by the outline tree arrangement unit in order to prevent self-intersection during the morphing process; and a sequence generator and a morphing viewer, for performing the morphing process in response to the progress made by the smoothing process performed by the smoothing processor.

22 Claims, 14 Drawing Sheets

DATA IN NODES OF OUTLINE TREE

| | |
|---|---|
| DELETE FLAG (INTEGER) | FLAG TO BE SET TO INDICATE WHETHER NODE IS TO BE DELETED TO ARRANGE OUTLINE TREE |
| NUM POINT (INTEGER) | THE NUMBER OF VERTEXES OF OUTLINE |
| NUM CHILD (INTEGER) | THE NUMBER OF CHILD NODES LOCATED BELOW SPECIFIC NODE |
| OUTLINE (REAL NUMBER ARRAY) | INITIAL COORDINATE VALUE FOR EACH VERTEX OF OUTLINE |
| DEFORM OUTLINE (REAL NUMBER ARRAY) | COORDINATE VALUE USED FOR MORPHING AT EACH VERTEX OF OUTLINE |
| XMIN, XMAX, YMIN, YMAX (REAL NUMBER) | COORDINATES OF BOUNDING BOX |
| CHILD (POINTER ARRAY TO NODE) | SPECIFIC NODE POINTER TO CHILD NODE |
| CX, CY (REAL NUMBER) | COORDINATE VALUE OF CENTER OF BOUNDING BOX |

FIG.8

```
u=(t-T1)/(T2-T1);
v=(T2-t)/(T2-T1);
for(i=0;i<node->child[k]->numPoint;i++){
        x=v*node->child[k]->outline[i][0]+u*node->child[k]->cx;
        y=v*node->child[k]->outline[i][1]+u*node->child[k]->cy;
}
```

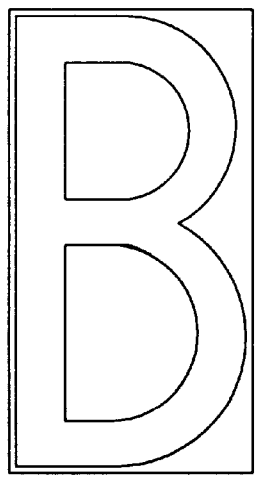
13-1
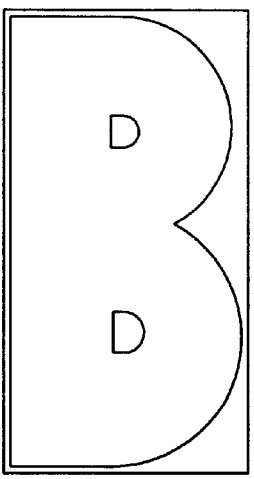
13-2
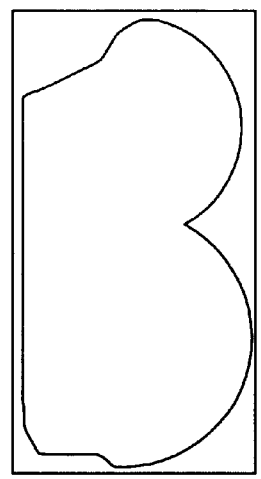
13-3
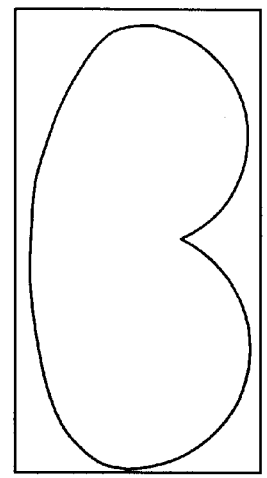
13-4
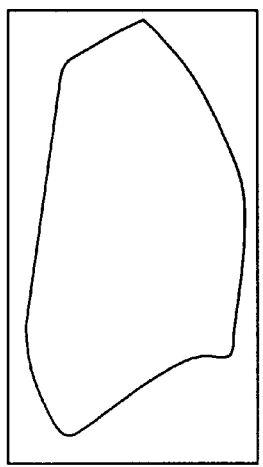
13-5
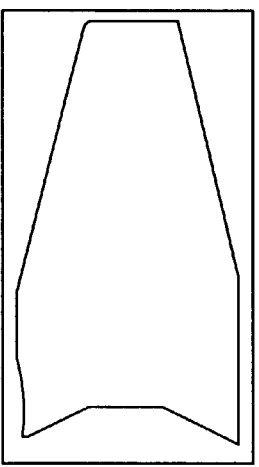
13-6
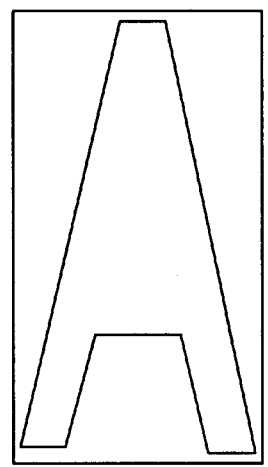
13-7
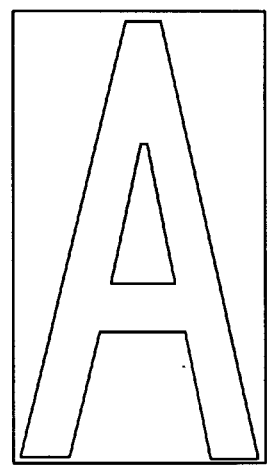
13-8
FIG.13

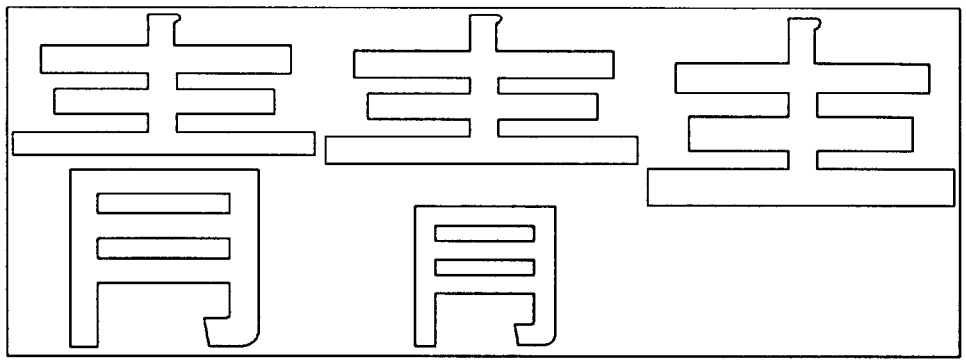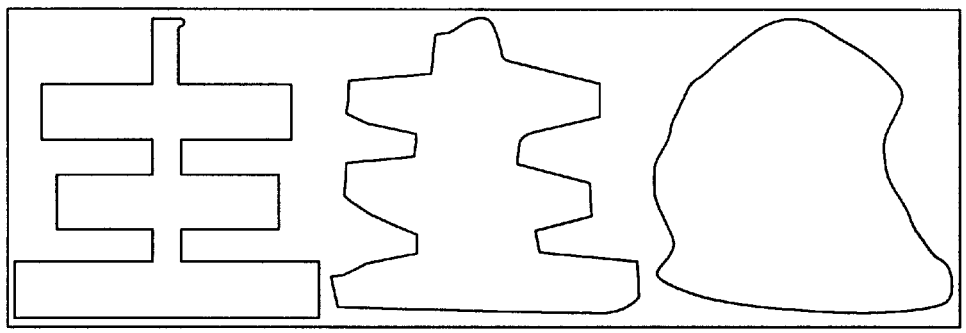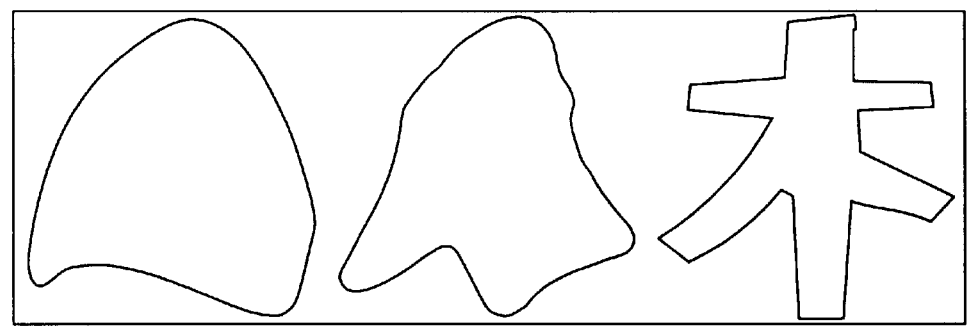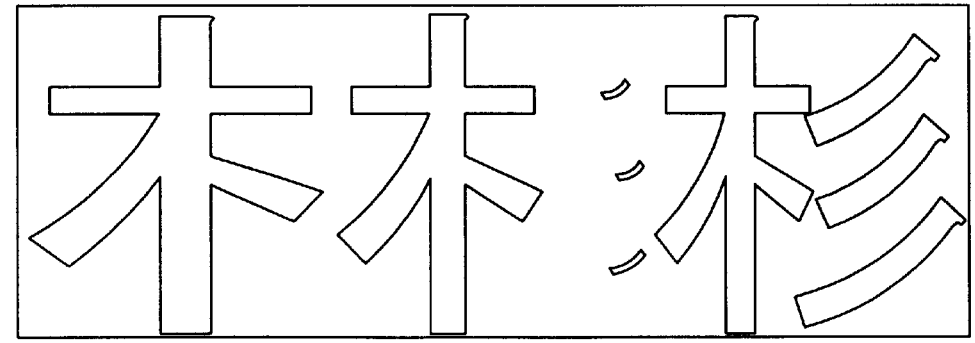
FIG.15

MORPHING PROCESSING APPARATUS, METHOD, STORAGE MEDIUM, PROGRAM TRANSMISSION APPARATUS, AND ANIMATION CREATION APPARATUS

FIELD OF THE INVENTION

The present invention relates to a method for morphing, in an object space, the outlines of characters or figures consisting of straight lines and curves.

BACKGROUND ART

Morphing, which is short for metamorphosing, is an animation technique involving moving a control point set on an image, so that image can be smoothly and seamlessly transformed into another.

A conventional technique for using morphing to transform a character on a display is disclosed in reference document 1, "Advanced Animation and Rendering Techniques," Alan Watt and Mark Watt, Addison-Wesley, 1992, pp. 413. In reference document 1, a method is described whereby characters defined using Bezier curves are transformed by linearly interpolating control points on the curves. As an actual operating example, in the document the transformation of the character "E" into the character "Z" is described.

However, the technique disclosed in reference document 1 is not generally applicable. It cannot be applied for a general outline font, such as a True Type font, that consists of line segments and Bezier curves. Furthermore, the technique presented in the document handles only characters for which the outline consists of a single line, such as "E" or "Z." That is, the technique in reference document 1 cannot be applied for characters for which the outlines consist of multiple lines, including characters containing internal spaces, such as "A" or B," or characters, such as Chinese characters, for which many strokes are used.

Techniques for using morphing to transform two-dimensional outline curves are also disclosed in: reference document 2, "A Physically Based Approach to 2-D Shape Blending," T. W. Sederberg, et al., SIGGRAPH Proceeding, 1992, pp. 25–34; reference document 3, "2-D Shape Blending: An Intrinsic Solution to the Vertex Path Problem," T. W. Sederberg, et al., SIGGRAPH Proceeding, 1993, pp. 15–18; reference document 4, "A Fuzzy Approach to Digital Image Warping," Y. Zhang, 1996, July, pp. 34–41; and reference document 5, "Self-intersection Elimination In Metamorphosis of Two-dimensional Curves," T. Samoilov and G. Elber, The Visual Computer, 1988, Vol. 14, pp. 415–428.

The technique disclosed in reference documents 2 and 3 employs an algorithm whereby an outline consisting of straight lines (sides), such as linear lines or polylines, is transformed by using, as parameters, angles formed by adjacent sides and the lengths of these sides. However, it is difficult for this technique to perform the morphing of a figure, such as a character, having many raised and recessed portions.

The technique disclosed in reference document 4 is a method for distorting a two-dimensional polygonal image to perform morphing in an image space. However, since this technique processes an image in the image space, the outline has jaggy contours. Furthermore, the size of a figure cannot be enlarged or reduced (morphing cannot be performed using an arbitrary scale).

Reference document 5 discloses two algorithms to prevent self-intersection during the morphing process. However, the premise is that two two-dimensional closed curves are similar in phase so that figures that can avoid self-intersection during transformation are limited.

As is described above, it is difficult to employ the known morphing techniques to transform the outlines of complicated figures, such as characters.

When the process is performed in an image space, as disclosed in the referenced document 4, the outline of the image is jaggy, and a satisfactory appearance cannot be obtained. Further, since an arbitrary scale cannot be used only limited visual effects are possible.

When the image processing is performed in object space using vectors, the types and shapes of target figures for which the processing can be performed are limited. In the method of reference document 1 only figures that have outlines consisting of single lines can be handled. With the method of reference documents 2 and 3, figures having many raised and recessed portions cannot be handled.

In addition, it is important self-intersection in an outline be avoided because the internal space of the outline may not satisfactorily be solidly painted with a specific color. The technique disclosed in reference document 5 is not generally applicable because the figures for which self-intersection can be avoided are limited.

Therefore it is one object of the present invention to perform morphing, in a vector space, for the outlines for various types and shapes of figures.

It is a further object of the present invention to perform morphing for a figure that consists of a plurality of outlines.

It is still a further object of the present invention to perform morphing for a figure having raised and recessed portions, while preventing self-intersection.

It is another object of the present invention to perform morphing for a character or for a character string on a computer display device.

SUMMARY OF THE INVENTION

According to the present invention, a morphing processing apparatus, which performs a morphing process for the smooth transformation of one figure into another, comprises: an outline extractor, for receiving two target figures for the morphing process and for extracting a set of outlines for each of the target figures; an outline arrangement unit, for retaining one specific outline of each of the two sets of outlines extracted for the target figures and for deleting the other outlines; a smoothing processor, for performing a smoothing process for the two outlines for the target figures that are retained by the outline arrangement unit in order to prevent self-intersection during the morphing process; and a morphing execution unit, for performing the morphing process in response to the progress made by the smoothing process performed by the smoothing processor.

The outline arrangement unit includes: an outline tree generator, for generating an outline tree having nodes that correspond to the outlines that are extracted for the two target figures by the outline extractor and that reflect the relationship of the outlines; and an outline tree arrangement unit, for retaining only one specific node, of those nodes of the outline tree that are generated by the outline tree generator, for each of the figures and for deleting the other nodes in accordance with a predetermined rule, wherein the smoothing processor performs the smoothing process for each outline that corresponds to one of the nodes that are retained as a result of the process performed by the outline arrangement unit. This arrangement is preferable because a desired outline can be retained by designating the node of the outline tree, while taking the structure of the outline tree into account. Further, as will be described later, information concerning a bounding box that encloses an outline is stored in the node of the outline tree. In this case, a node for which the size of the bounding box is the maximum may be retained.

Furthermore, the outline tree generator receives the outlines of the target figures that are extracted by the outline extractor, designates, for each of the outlines, a bounding box that encloses the pertinent outline, and generates an outline tree based on the relationship existing between the bounding boxes. This arrangement is preferable because the relationship of the outlines that constitute the target figure will be readily apparent. While an arbitrary shape can be selected for a bounding box, a rectangular shape is easy to handle when a target figure is a character.

In addition, when a curve is included in the outlines of the target figures, the outline extractor divides the curve into line segments and performs segment approximation. Therefore, the outline can be treated as a polygon, and the process can be generalized so that it can be performed regardless of the shape of the target figure.

Further, the outline extractor receives, as a target figure, an outline font character and extracts the outline of the character. As a result, excellent visual effects can be provided for the display of a text document. Moreover, if the outline of a bit-mapped font can be extracted as a pre-process, this can also be employed as a morphing target.

However, as a target figure for the extraction of an outline, the outline extractor normally receives a true type font character. Thus, since morphing can be performed for fonts that are widely used by personal computers, this technique is more commonly employed.

As the smoothing process, the smoothing processor performs Laplacian smoothing for the outline. Laplacian smoothing is merely an example smoothing process, however, and another process may be employed.

The morphing execution unit includes: a sequence generator for generating a sequence file in which the outlines obtained by the smoothing processor are arranged along a time parameter; and a morphing execution section for performing morphing based on the sequence file obtained by the sequence generator. This arrangement is superior because not only morphing where self-intersection does not occur can be implemented by tracing the sequence file, but also morphing in the opposite direction can be easily performed by tracing the sequence file backward. When self-intersection does not occur during the morphing process, even though the smoothing process is not performed, the sequence file can be formed of only the two outlines that are retained by the outline arrangement unit.

Further, according to the present invention, a morphing method, for smoothly transforming two figures from one to the other by morphing, comprises: an outline extraction step of extracting, as line segments, outlines of two target figures for a morphing process; an outline tree generation step of generating an outline that has nodes corresponding to the outlines extracted for each of the target figures, and that reflects the relationship of the outlines; a node deleting step of retaining one specific node from among the nodes of the outline tree generated for each of the target figures, and deleting the other nodes; a vertex count matching step of matching the number of vertexes of two outlines that correspond to the nodes that are respectively retained in the outline trees for the two target figures; a smoothing step of performing a smoothing process for the two outlines for which the number of vertexes match, so that self-intersection does not occur during the morphing process; a sequence file generation step of generating a sequence file along a time parameter for the outlines obtained in the smoothing process; and a morphing step of performing morphing based on the sequence file, and of displaying the results.

The outline tree generation step includes the steps of: designating, for each of the outlines that constitute the target figures, a bounding box that encloses the pertinent outline; generating a bounding box that can enclose each of the target figures, and generating a root node of the outline tree that corresponds to the bounding box; and selecting one of the bounding boxes respectively generated for the outlines, generating a child node that corresponds to the outline of the selected bounding box, and inserting the child node under the root node. The step of inserting the child node includes the step of: recurrently inserting the child node under the different node when the bounding box that encloses an outline that corresponds to a predetermined child node is completely included in a bonding box that encloses an outline corresponding to a different child node that has already been inserted under the root node. This arrangement is preferable because the geometrical structure of the outlines of the target figure can be reflected in the structure of the outline tree.

The node deleting step includes the steps of: determining a node to be retained in accordance with the predetermined rule; and moving, to one arbitrary point, vertexes of the outlines that correspond to the other nodes, and regarding the point as a point that is not finally displayed. Thus, the state wherein unwanted outlines are gradually removed can be displayed. While an arbitrary position can be set for a point whereat the outlines converge, it is preferable that the outlines be moved to the center of the bounding box because the display is visually well balanced.

The vertex count matching step includes the steps of: arranging vertexes of two outlines beginning at a specific position and extending around the two outlines in a constant direction; employing a parameter whose value falls within a constant range to represent coordinates of the vertexes that are rearranged; and comparing the parameters of the vertexes along the two outlines, and mutually employing the parameters of the vertexes for one of the outlines to linearly interpolate the vertexes with the other outline. At the step of employing the parameters of the vertexes to perform linear interpolation for the vertexes of the two outlines, points that correspond to the vertexes of one of the outlines are added to the other outline, and vice versa. This arrangement is superior because a new vertex obtained by linear interpolation need not be merged or sorted between the files of the two outlines.

At the smoothing step, the Laplacian smoothing is repeated for the outlines an arbitrary number of times, and when during morphing self-intersection does not occur, the Laplacian smoothing is halted. It is visually preferable that the Laplacian smoothing be halted during the process, because the target figure can be prevented from becoming substantially circular as a result of the smoothing, regardless of the original shape.

The smoothing step includes the steps of: performing a trial morphing for two outlines for which the number of vertexes match, and for confirming the occurrence or non-occurrence of self-intersection; and repeating the Laplacian smoothing for the two outlines an arbitrary number of times when self-intersection occurs as a result of the trial morphing. The smoothing step recurrently repeats the two steps until self-intersection does not occur, even when the trail morphing is performed. This arrangement is superior because the Laplacian smoothing can be mechanically halted when self-intersection does not occur.

Further, according to the present invention, a storage medium is provided on which input means for a computer stores a computer-readable program, which permits the computer to perform: a process for inputting two target figures for morphing; a process for extracting, as line segments, outlines of the two target figures; a process for generating an outline tree that has nodes corresponding to the outlines extracted for each of the target figures, and that reflects the relationship of the outlines; a process for retaining one specific node from among the nodes of the outline tree generated for each of the target figures, and deleting the other nodes; a process for matching the number of vertexes of two outlines that correspond to the nodes that are respectively retained in the outline trees for the two target figures; a process for performing a smoothing process for the two outlines for which the number of vertexes match, so that self-intersection does not occur during the morphing process; a process for generating a sequence file along a time parameter for the outlines obtained in the smoothing process; and a process for performing morphing based on the sequence file, and of displaying the results. This arrangement is preferable because a computer into which this program is loaded can perform morphing without self-intersection occurring.

Further, according to the present invention, a program transmission apparatus comprises: storage means, for storing a program to permit a computer to perform a process for inputting two target figures for morphing, a process for extracting, as line segments, outlines of the two target figures, a process for generating an outline tree that has nodes corresponding to the outlines extracted for each of the target figures, and that reflects the relationship of the outlines, a process for retaining one specific node from among the nodes of the outline tree generated for each of the target figures, and deleting the other nodes, a process for matching the number of vertexes of two outlines that correspond to the nodes that are respectively retained in the outline trees for the two target figures, a process for performing a smoothing process for the two outlines for which the number of vertexes match, so that self-intersection does not occur during the morphing process, a process for generating a sequence file along a time parameter for the outlines obtained in the smoothing process, and a process for performing morphing based on the sequence file, and of displaying the results; and transmission means for reading the program from the storage means and for transmitting the program. With this program transmission apparatus, the technique of the present invention can be provided for a client without a storage medium, such as a CD-ROM, which is a program loading form, being required.

Furthermore, a morphing processing apparatus comprises: a calculator; and a display device for displaying the results obtained by the calculator, wherein the calculator receives, as targets, a figure string consisting of m arbitrary figures as elements and a figure string consisting of n arbitrary figures as elements, and correlates the elements of the two figure strings with each other, wherein, when the numbers of the elements of the two figure strings do not match, the calculator adds, to the figure string whose element is the shortest, circles that are not displayed on the display device and that are equivalent in number to the shortest elements, so that the circles correspond to extra elements of the other figure string, and wherein the calculator performs morphing for the elements that are correlated with each other, so as to smoothly transform one figure string into the other figure string. This arrangement is preferable because morphing can be performed for figure strings, each of which consist of multiple figures, and because general use of this technique has increased.

According to the present invention, a morphing processing apparatus can be provided that comprises: an outline extractor, for receiving two target characters for the morphing process and for extracting a set of outlines for each of the target characters; an outline arrangement unit, for retaining one specific outline of each of the two sets of outlines extracted for the target characters and for deleting the other outlines; a smoothing processor, for performing a smoothing process for the two outlines for the target characters that are retained by the outline arrangement unit in order to prevent self-intersection during the morphing process; and a morphing execution unit, for performing the morphing process in response to the progress made by the smoothing process performed by the smoothing processor. A target character for morphing can be defined as a character specified by character code that is used by a computer or a dedicated word processor. Thus, a character entered at a keyboard can be used unchanged to perform morphing therefor.

Further, according to the present invention, a morphing processing apparatus can be provided, which comprises: an outline extractor, for receiving two target fonts for a morphing process and for extracting a set of outlines for each of the target fonts; an outline arrangement unit, for retaining one specific outline of each of the two sets of outlines extracted for the target fonts and for deleting the other outlines; a smoothing processor, for performing a smoothing process for the two outlines for the target fonts that are retained by the outline arrangement unit in order to prevent self-intersection during the morphing process; and a morphing execution unit, for performing the morphing process in response to the progress made by the smoothing process performed by the smoothing processor. With this arrangement, a transformation process using morphing can also be performed for a character or a character string that is displayed with different fonts.

Furthermore, according to the present invention, a morphing processing apparatus that smoothly transforms one figure into another one comprises: an outline arrangement unit for receiving sets of outlines that respectively constitute two target figures for a morphing process, and for retaining a specific outline selected from each of the sets of outlines for the target figures and for deleting the other outlines; a smoothing processor, for performing a smoothing process for the two outlines for the target figures that are retained by the outline arrangement unit in order to prevent self-intersection during the morphing process; and a morphing execution unit, for performing the morphing process in response to the progress made by the smoothing process performed by the smoothing processor. With this arrangement, outline information can be obtained directly from a target figure, such as a character of an outline font, that possesses the outline information, and morphing can be performed.

In addition, according to the present invention an animation creation apparatus, for creating an animated sequence wherein one figure is smoothly transformed into another, comprises: an outline extractor, for receiving two target figures for the morphing process and for extracting a set of outlines for each of the target figures; an outline arrangement unit, for retaining one specific outline of each of the two sets of outlines extracted for the target figures and for deleting the other outlines; a smoothing processor, for performing a smoothing process for the two outlines for the target figures that are retained by the outline arrangement unit in order to prevent self-intersection when one outline is transformed to the other; and an image processor, for creating an animated sequence wherein one figure is smoothly transformed into another in response to the progress made by the smoothing process performed by the smoothing processor.

BRIEF DESCRIPTION OF THE DRAWINGS

FIG. 8 is a diagram for explaining example data stored in the nodes of the outline tree.

FIG. 13 is a diagram for explaining the process for transforming a character "B" into a character "A."

FIG. 15 is a diagram for explaining the process for transforming a different character into another character.

DETAILED DESCRIPTION

The present invention will now be described in detail by referring to the preferred embodiment shown in the accompanying drawings.

Figure 1:
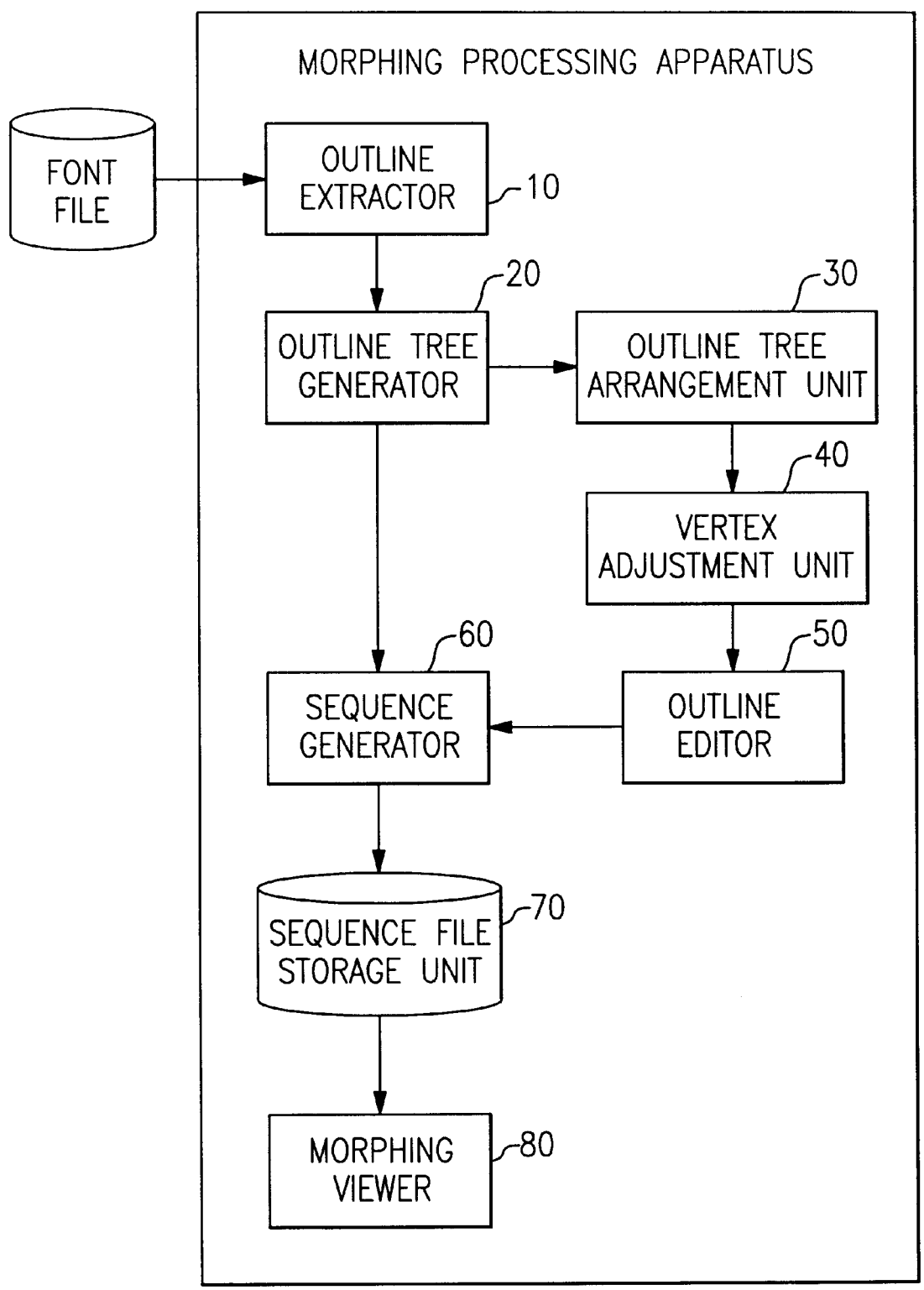
FIG. 1 is a diagram for explaining the overall arrangement of a morphing processing apparatus according to one embodiment of the present invention.

FIG. 1 is a diagram showing the overall arrangement of a morphing processing apparatus according to one embodiment of the present invention. In FIG. 1, an outline extractor 10 uses morphing to extract the outlines of a figure that is a target for image processing (hereinafter referred to as a target figure); an outline tree generator 20 generates an outline tree that employs the outlines of the target figure as nodes; an outline tree arrangement unit 30 arranges the outline tree that is generated by the outline tree generator 20, so that for the outline tree only a root node and one child node are retained; a vertex adjustment unit 40 matches the numbers of the vertexes of the outlines of the child nodes that are retained for two target figures each, and so that self-intersection does not occur, an outline editor 50 transforms the outline for which the number of vertexes is adjusted by the vertex adjustment unit 40; a sequence generator 60 generates a sequence file for outlines to which the processing performed by the outline tree generator 20 of the outline editor 50 is reflected, and a sequence file storage unit 70 stores the sequence file generated by the sequence generator 60; and a morphing viewer 80 reads the sequence file of outlines stored by the sequence file storage unit 70, performs morphing based on the pertinent sequence file and displays an animation sequence on the display device.

The outline extractor 10 receives a target figure, and extracts the outline as a combination of line segments. When a curve is included in the outline of the target figure, the outline extractor 10 performs segment approximation by dividing the curve into line segments (tessellation), and obtains a string of line segments that forms the outline. Thus, the outline of the target figure is approximated by using polygons. Further, each line segment is represented by a vector.

In this embodiment, a target figure need not be limited to a single outline. That is, a figure internally containing an open space, or a figure constituted by assembling several other figures, can also be regarded as a single target figure. For example, as characters that are used as target figures, the character "B" is a figure formed using an outline that delineates the character's outer shape and additional outlines that describe two internal spaces, and a Chinese character, is a figure for which four outlines are employed.

It should be noted that there are target figures before and after a figure for which transformation is performed using morphing. Therefore, the outlines for these two target figures are also extracted.

The outline tree generator 20 receives the outlines that are extracted for the target figure by the outline extractor 10, designates, for each outline of the figure, a bounding box that encloses the pertinent outline, and generates an outline tree based on the relationship of these bounding boxes that enclose the outlines. The outline tree is generated based on the premise that for a target figure there will always at least one outline. The general shape of a bounding box is a rectangle, but other shapes may be employed. In the following explanation, a rectangular bounding box is used.

An outline tree is constructed by positioning, under a root node, child nodes that correspond to individual outlines. Each child node stores, for a corresponding outline, information required to prepare the outline tree, to adjust the vertexes, and to edit the outlines, which will be described later. For example, as is shown in FIG. 8, the following information is stored in the child node: a delete flag—a flag (an integer) for designating whether the node is to be deleted after the outline tree has been prepared—; a num Point—the number (an integer) of vertexes on the outline—: a num Child—the number (an integer) of child nodes depending from a specific node—; an outline—the initial coordinate value (a real number array) at each vertex of the outline—; a deform outline—a coordinate value (a real number array), for each vertex of the outline, which is used for morphing—; xmin, xmax, ymin and ymax—coordinates (real numbers) for a bounding box—; children—pointers to child nodes of the specific node (a pointer array to nodes)—; and cx, cy—coordinate values (real numbers) in the center of a bounding box—.

Figure 9:
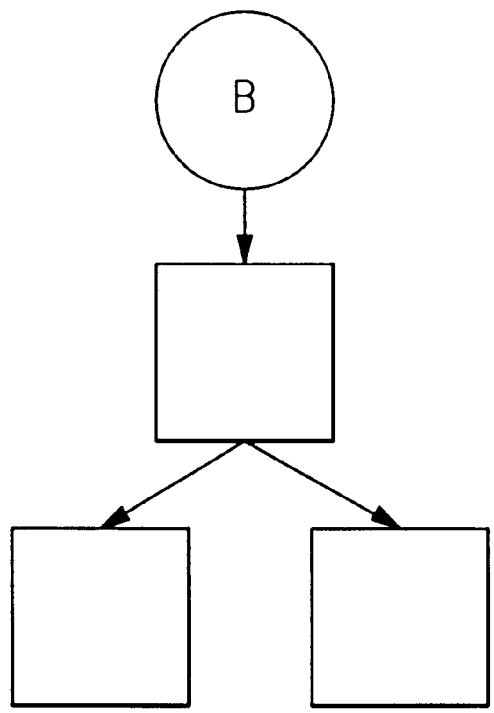
FIG. 9 is a diagram for explaining an outline tree when a character "B" is a target figure.
Figure 10:
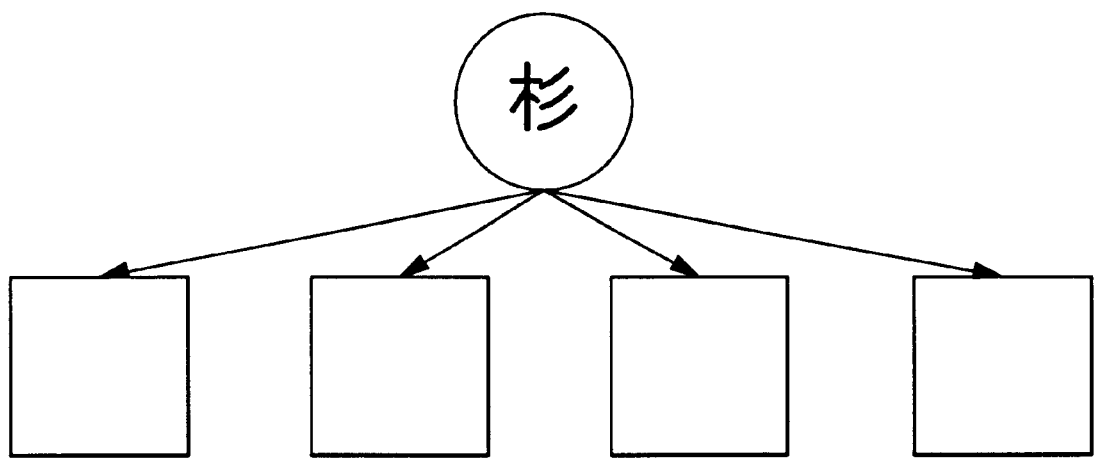
FIG. 10 is a diagram for explaining an outline tree when a Chinese character is a target figure.

FIG. 9 is a diagram showing an outline tree when the character "B" is used as a target figure, and FIG. 10 is a diagram showing an outline tree when a Chinese character is used as a target figure. As is shown FIG. 9, a node having an outline, such as an internal space in character "B," which is fully enclosed by the bounding box of an upper node, is regarded as a child of the upper node. On the other hand, when a plurality of bounding boxes for the Chinese character are arranged in parallel, the individual nodes are situated at the same level.

Figures 11, 12:
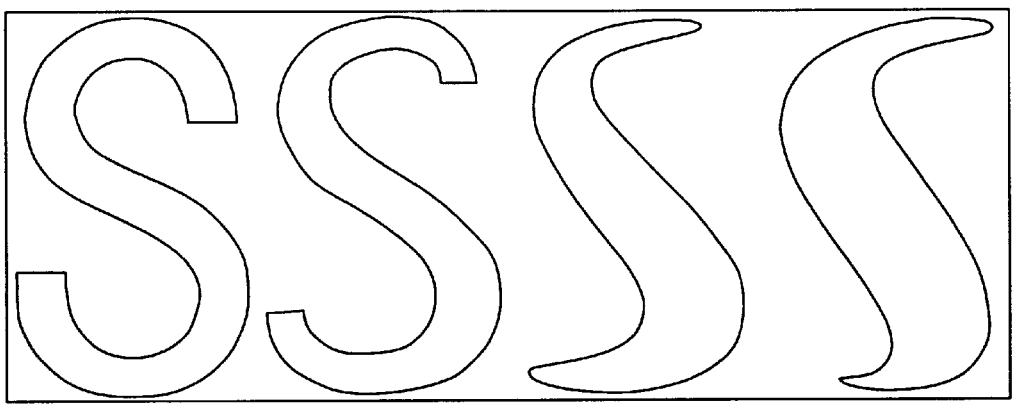
FIG. 11 is a diagram showing a outline deletion method written in a C-oriented language.
FIG. 12 is a diagram for explaining the process for transforming a character "S" into a character "C."

The outline tree arrangement unit 30 leaves only one child node dependent from the outline tree generated by the outline tree generator 20, and deletes the other child nodes. To delete these nodes, all the vertexes of the outline of each node to be deleted are moved toward the center of the corresponding bounding box. FIG. 11 is a diagram showing, while the overall time parameter is defined as t, how a method is written in a C-oriented language, whereby during a period from time T1 to time T2 a coordinate variable outline [k] [2], for supporting the outline of a node k, is moved to the center coordinates (cx, cy) of the bounding box. Based on this description, when (x, y) is drawn between time [T1, T2] on the display device, the outline of each node indicated by the node k converges toward the center of the corresponding bounding box, and finally disappears as a point that is not displayed on the display device.

Through this processing, the outline tree is arranged, and only one outline remains for one target figure. Thus, the two target figures before and after the transformation are respectively represented by one polygon. That is, when m vertexes constitute the outline, an m-polygon is obtained. From among a plurality of outlines provided for a target figure, an arbitrary outline to be retained can be determined. Generally, when the outline is retained for which the size of the bounding box that is designated for it is the maximum, a satisfactory appearance is obtained. Also, an outline for a characteristic portion of a target figure may be retained. For example, for a Chinese character that is used as a target figure, an outline to be retained can be determined while taking into consideration the stroke order for the character.

The vertex adjustment unit 40 receives one outline that is retained for each of two target figures by the outline tree arrangement unit 30, and matches the numbers of the vertexes of the pertinent outlines. This process is performed because the number of vertexes generally differs for two outlines that are extracted for two target figures, and morphing can not be performed under this condition. The process for matching the numbers of vertexes for two outlines is performed as follows.

First, the string of vertexes that forms the outline are arranged beginning with a vertex at a specific position, and continuing around the pertinent outline in a constant direction. Specifically, the vertexes are arranged beginning with the vertex having the maximum Y coordinate value (when there is more than one such vertex, the vertex having the maximum X coordinate value). Thus, the start positions for the following process can substantially be aligned with the upper right coordinates of the bounding box, and self-intersection, which will be described later, seldom occurs. It should be noted that the alignment of the start positions substantially with the coordinates of the upper right of the bounding box is merely an example, and the process can be started at an arbitrary position.

The overall length of each outline is obtained, and the coordinate values of each vertex is represented by using parameters [0.0–1.0], wherein the parameter for the start point is 0.0 and the parameter for the same point, whereat the process travels along the outline and returns is 1.0. Specifically, when the overall length of the outline is defined as L, and the number of vertexes is defined as m, a parameter p is represented by equation 1.

$$p = \frac{\sum_{i=2}^{m} |D_i - D_{i-1}|}{L} \quad \text{[Equation 1]}$$

In the above equation, $D_i$ denotes the coordinate value (xi, yi) of the i-th vertex, and $|D_i - D_{i-1}|$ denotes a distance between the (i−1)th vertex and the i-th vertex. The parameter p is calculated using the floating decimal mode, and generally, except for 0.0 and 1.0, on two outlines no other parameters match. But even if there are other matched parameters, they do not affect the succeeding calculation. Next, the parameters for the vertexes of one of the outlines are employed to linearly interpolate the vertexes of the other outline, so that the numbers of the vertexes of the two outlines match. To reflect the results of the linear interpolation to the vertex string of each outline, the coordinate values obtained by the linear interpolation are written to a different file from the file for the vertex string of each outline, and in the parameter space, merging and sorting is performed while the parameters are used as keys.

Instead of writing the coordinate values obtained by the linear interpolation to a different file, the following method may be employed. Generally, parameter $p_i$ for one of the outlines (OL1) does not appear in the other outline (OL2), except for the 0.0 and the 1.0 that appear at the ends. Therefore, when $p_{j-1} < p_i < p_j$, wherein $p_{j-1}$ and $p_j$ are parameters for the vertexes of the outline OL2), vertex $D^i_{new}$, represented by equation 2, is added as a new vertex between the vertexes $D_{j-1}$ and $D_j$ on the outline OL2. Since the vertex $D^i_{new}$ that is added during this process is located along the line segment between the vertexes $D_{j-1}$ and $D_j$, which are originally present on the outline OL2, the vertex $D^i_{new}$ is not truly a vertex, although it should be used as a vertex corresponding to the vertex on the outline OL1. In other words, the line segment $D_{j-1} - D^i_{new}$ and the line segment $D^i_{new} - D_j$ are parallel to each other.

$$D^i_{new} = \frac{p_j - p_i}{p_j - p_{j-1}} D_{j-1} + \frac{p_i - p_{j-1}}{p_j - p_{j-1}} D_j \quad \text{[Equation 2]}$$

A new vertex is added to the outline OL2 by performing this process for each vertex on the outline OL1. Similarly, a new vertex is added to the outline OL1 based on the parameters of the vertexes of the outline OL2. As a result, the numbers of the vertexes of the outlines OL1 and OL2 match. And since this process is performed, the merging and the sorting of the files is not required.

To prevent the occurrence of self-intersection during morphing, the outline editor 50 performs a smoothing process, as needed, for the two outlines, the numbers of the vertexes of which are matched by the vertex adjustment unit 40. When morphing is simply performed for the outlines after the number of the vertexes have been matched by the vertex arrangement unit 40, depending on the shape of the outline, self-intersection may occur. Self-intersection especially tends to occur when the outline of a complicated shape has many raised and recessed portions. When self-intersection occurs during transformation, not only is the appearance poor, but also the process for solidly painting the inside of the outline with a specific color can not be satisfactorily performed. Therefore, when it is probable that self-intersection will occur during the morphing of two outlines, the outlines are transformed into a shape for which self-intersection does not occur. The process to be employed for this purpose is the smoothing process.

The condition under which morphing can be performed without causing self-intersection is one wherein the overall shape of the outline is gradually raised outward. A simple shape, such as a circle, a square or a triangle, corresponds to this type of shape. On the other hand, an arbitrary target figure may have a complicated shape that, on the outline, includes sharp raised and recessed portions. Especially, for example, for a Chinese character that is used as a target figure may have a complicated shape. Thus, for such an outline, the smoothing process is performed to remove the raised and recessed portions. A specific smoothing process that can be used is Laplacian smoothing, which is used for signal processing. According to this method, equation 3 is calculated to obtain a coordinate value $D_i'$ for each vertex during the smoothing process.

$$D_i' = D_i + a \times \Delta D_i \quad \text{[Equation 3]}$$
$$\Delta D_i = \frac{1}{2}(D_{i-1} - D_i) + \frac{1}{2}(D_{i+1} - D_i)$$

In the above equation, a variable "a" is a parameter for controlling the smoothing speed, and is normally a value of from 0.0 to 1.0. When the Laplacian smoothing process is performed multiple times, the outline is gradually smoothed and recessed portions are removed.

As the Laplacian smoothing process is repeated, the outline assumes a shape to a circle. Therefore, when, regardless of the shapes of the two target figures before and after transformation, the smoothing is repeated for the outlines of the two target figures until they are substantially circles, morphing can be performed without self-intersection occurring. However, visually, regardless of the shape of the target figure, it is not preferable for the outline of a figure to assume a shape that is similar to a circle during the morphing process. Therefore, in actuality, the Laplacian smoothing is repeated several times for the outlines of the two target figures before and after transformation, but is halted before the shape of either outline approaches that of a circle, and thus the morphing is performed for the two outlines that only to a degree have been smoothed. In order to determine whether the smoothing process is to be halted, only the results obtained by trial morphing must be fed back, and the Laplacian smoothing must only be repeated until it is apparent that self-intersection will not occur. That is, trial morphing is performed to confirm whether or not self-intersection will occur, and when self-intersection does occur, the Laplacian smoothing is repeated and the trial morphing is again performed. Then, when self-intersection does not occur this time, the smoothing process is halted.

After completing the above processing, the outline editor 50 outputs two sets of outlines that respectively correspond to two target figures. Each of the outline sets includes the initial outline input to the outline editor 50, and the outline obtained by using the Laplacian smoothing. Not all the outlines obtained by the Laplacian smoothing need be output, and several outlines that are properly smoothed need only be output in accordance with the number of outlines obtained. If self-intersection does not occur when the trial morphing is first performed without the Laplacian smoothing being employed, the smoothing process need not be performed. In this case, the two outlines are output that initially were input to the outline editor 50.

The sequence generator 60 employs the outline tree output by the outline tree generator 20 and the outline sets output by the outline editor 50, and as the transformation process progresses along the time parameter t for the overall morphing process, generates a sequence file for the outlines. That is, in the sequence file, the outlines at the individual steps of the transformation process are arranged along the time parameter t. The sequence file for the outlines generated by the sequence generator 60 is stored in the sequence file storage unit 70.

The morphing viewer 80 reads the sequence file from the sequence file storage unit 70, reproduces the outlines in the sequence file along the time parameter t, and displays, on the display device, a moving picture whose outlines are smoothly transformed by the morphing. Thus, the state wherein the outline is smoothly transformed from one target figure to the other target figure without self-intersection occurring is displayed on the display device. In this embodiment, the sequence file for the outlines is read from the sequence file storage unit 70. However, the sequence file output by the sequence generator 60 may be directly input to the morphing viewer 80.

The processing performed for this embodiment will now be described. As is stated above, in this embodiment, a figure having an arbitrary shape can be flexibly coped with as a target figure to be transformed by morphing. In this embodiment, a character is employed as a target figure, and selected for an outline font that is generally used by a computer, or for display or printing. Even if the target character is one selected from a bit-mapped font, the transformation process of this embodiment can be performed, just so long as the outline of the pertinent character can be extracted as a pre-process. Furthermore, an explanation has been given for an example wherein one character is transformed into another character while the two characters correspond to each other. However, a transformation can be performed while m characters correspond to n characters. A special process used for the transformation of multiple characters into multiple other characters will be described later.

Figure 2:
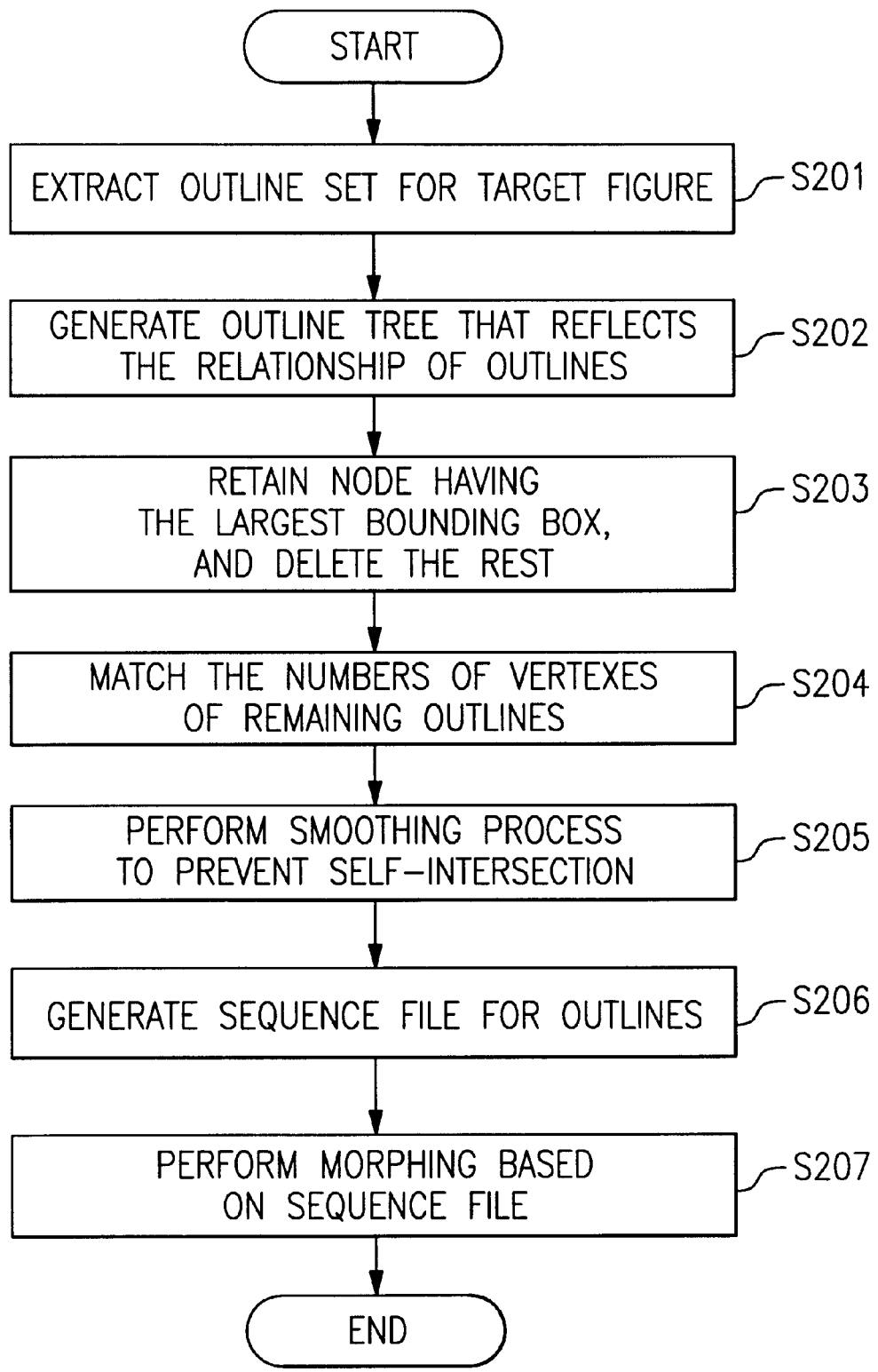
FIG. 2 is a flowchart for explaining the overall processing performed by the morphing processing apparatus according to the embodiment.

FIG. 2 is a flowchart showing the overall processing performed by the morphing processing apparatus according to the embodiment of the present invention.

In FIG. 2, the outline extractor 10 reads, from a font file, font data for two characters that are selected as target figures, and extracts the outlines of the two characters (step 201). When the outline font for the two characters is a True Type font that is widely used by personal computers for display or for printing, the outlines can be extracted by using a conventional Application Program Interface (API), such as the wglUseFontOutline function by OpenGL or the GetGlyphOutline function prepared by Windows (a trademark of Microsoft Corp.). When this type of function is employed, upon the receipt of a predetermined index, the number of outlines, the points (consisting of the outlines) included in the target character, the coordinates (vectors) of the points, the flags associated with the points, and the terminal end points of the outlines can be obtained as the outline structure of the pertinent character. The flag associated with a points includes information used to determine whether the pertinent point is the end point of a line segment or the control point for a two-dimensional Bezier curve. For a True Type font, a linear portion of the outline is represented by a line segment, and a smoothly curved portion is represented by a two-dimensional, piecewise Bezier curve. The outline extractor 10 obtains the outlines of the character, performs segment approximation for the portion represented by a Bezier curve, and outputs the results. Since the edge of a the character tends to be formed of a plurality of outlines, the output of the outline extractor 10 is a set of outlines (see {FX1} and {FX2} in FIG. 1).

In this embodiment, the target figure is True Type font; however, if an inherent API is employed for another outline font, such as a Type 1 font provided by Adobe Corp., the outlines can still be extracted.

The outline tree generator 20 generates the outline tree of the target character (step 202 in FIG. 2). A detailed algorithm used by the outline tree generator 20 is shown in FIG. 3.

Figure 3:
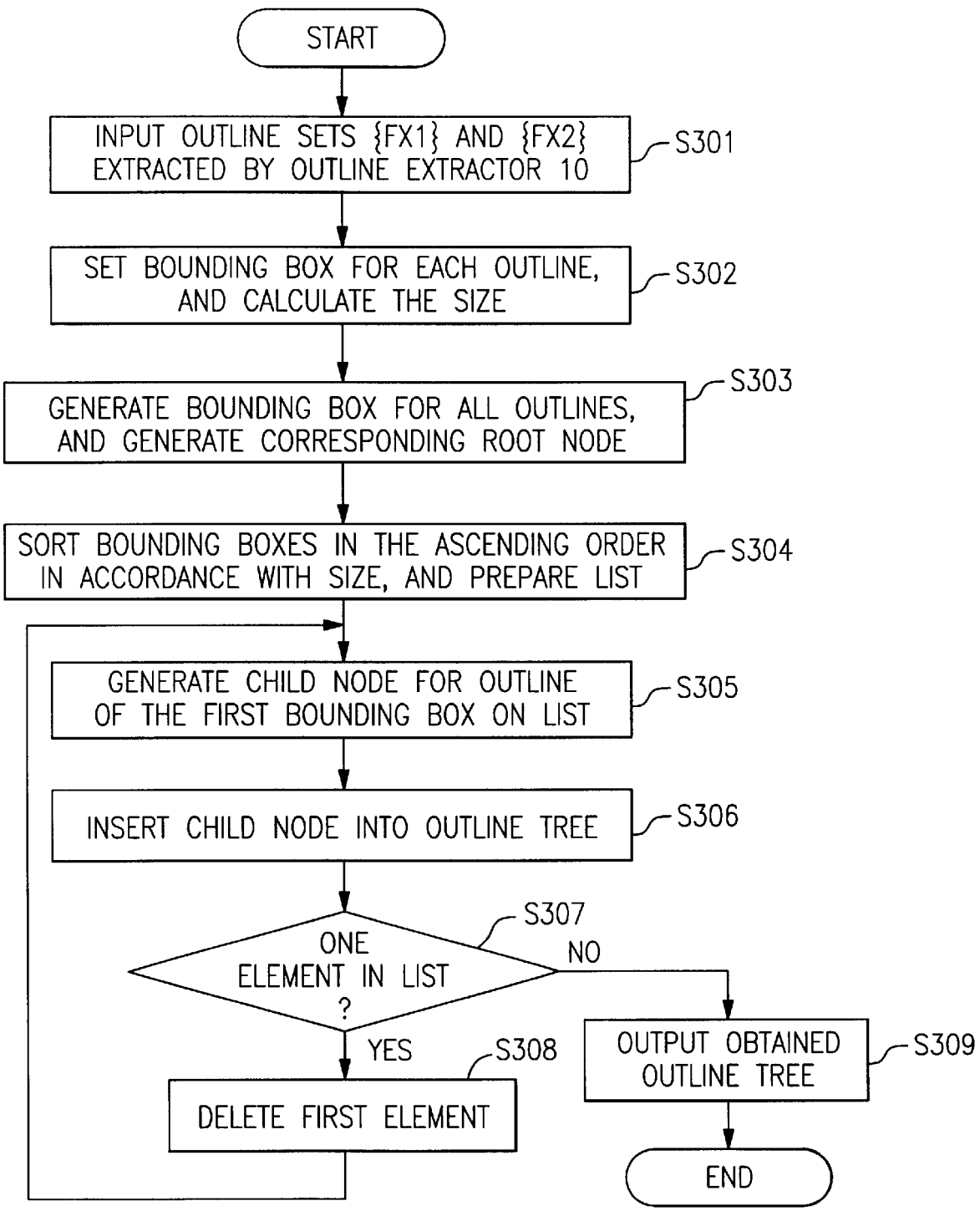
FIG. 3 is a flowchart for explaining a detailed algorithm used by an outline tree generator 20.

While referring to FIG. 3, the outline sets {FX1} and {FX2}, which are extracted by the outline extractor 10, are input (step 301). Then, a bounding box is established for each of the outlines that constitute each character, and the sizes of the bonding boxes are calculated (step 302). Following this, a bonding box for all the outlines is generated, and the root node of the outline tree is generated in consonance with the pertinent bonding box (step 303). The bonding box for the cumulative outlines is one that encloses all of a plurality of bonding boxes that are arranged, for example, in parallel for a Chinese character "□□." Therefore, when the bounding box that corresponds to the outermost outline of the character "B" encloses all the other outlines of the pertinent character, this bounding box differs from the bounding box for the cumulative outlines. Further, only information relevant to the bounding box (e.g., xmin, xmax, ymin, ymax, cx and cy in FIG. 8) is stored in the root node.

The bounding boxes that are established are sorted beginning with the maxim size, and a list of the bounding boxes is created (step 304). Then, a child node is generated that corresponds to the outline of the bounding box that is at the head of the list (step 305), and is inserted into the outline tree (step 306). If the bounding box of the outline of this child node is completely included in the bonding box of the outline for a different child node that has already been inserted into the outline tree, the pertinent child node is recurrently inserted under a different child node. Following this, a check is performed to determine whether there is only one element (a bounding box that corresponds to the last child node that was inserted into the outline tree) in the list. If there is only one element, the processing is terminated and the outline tree is output (steps 307 and 309). If there are a plurality of elements in the list, the first element (a bounding box that corresponds to the last child node that was inserted into the outline tree) is deleted, and the same process is performed for the outline of the bounding box that is now at the head of the list (steps 307 and 308).

In this manner, the outline trees X1 and X2 for two target characters are output by the outline tree generator 20.

Figure 4:
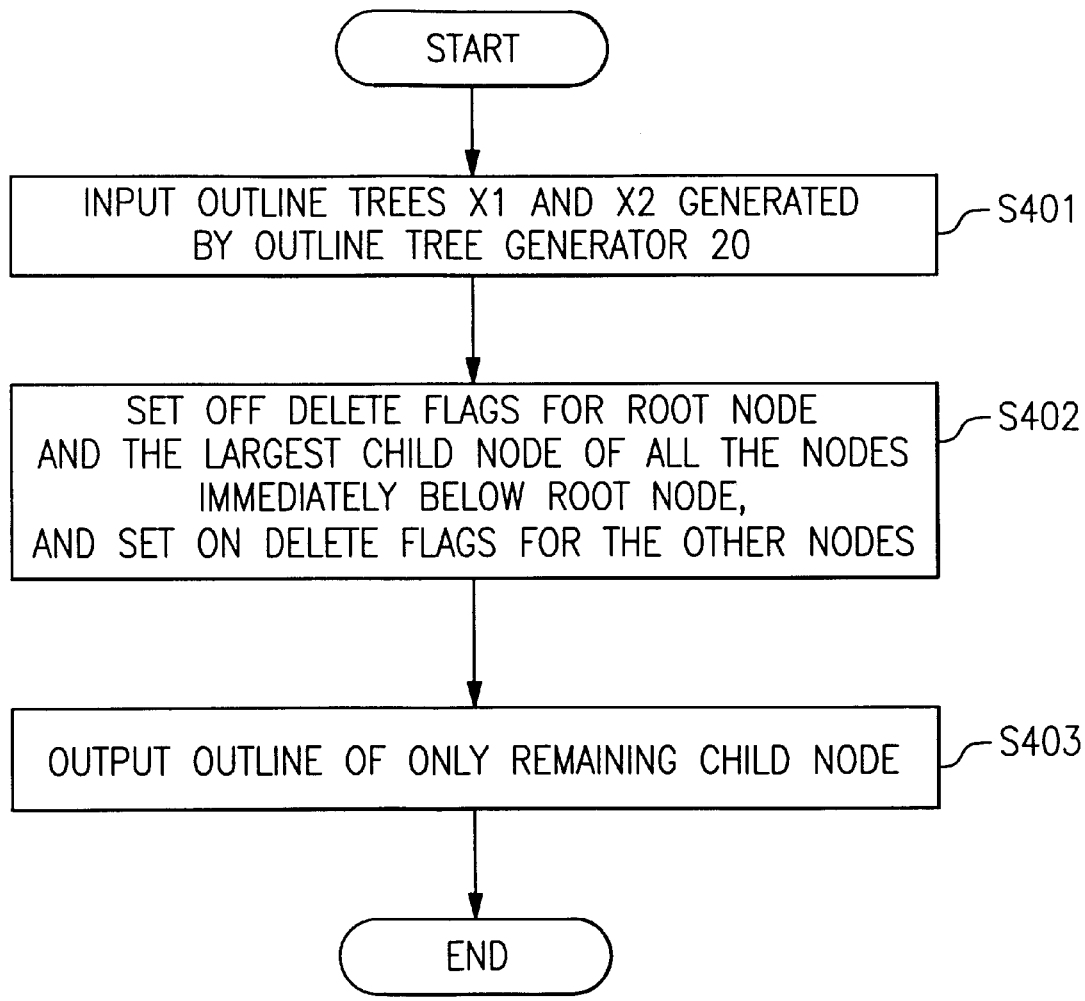
FIG. 4 is a flowchart for explaining a detailed algorithm used by an outline tree arrangement unit 30.

The outline tree arrangement unit 30 arranges the outline tree (step 203 in FIG. 2). A detailed algorithm used by the outline tree arrangement unit 30 is shown in FIG. 4. For the arrangement of the outline tree, only the largest bounding box is retained.

While referring to FIG. 4, the outline trees X1 and X2, which are generated by the outline tree generator 20, are input (step 401). Then, the delete flag is set to off for the root node and for the largest child node of all those located immediately below the root node, and the delete flag for the other child nodes are set to on (step 402). Then, a child node for which the delete flag is to on is moved toward the center of the bounding box, and is regarded as a point that is not displayed on the display device. The outline of this child node that is retained in this manner is output (step 403).

Through this processing, the outlines OL1 and OL2 of the largest bonding boxes are respectively output for the two target characters.

The vertex adjustment unit 40 matches the numbers of the vertexes of the outlines OL1 and 0L2 (step 204 in FIG. 2). A detailed algorithm used by the vertex adjustment unit 40 is shown in FIG. 5.

Figure 5:
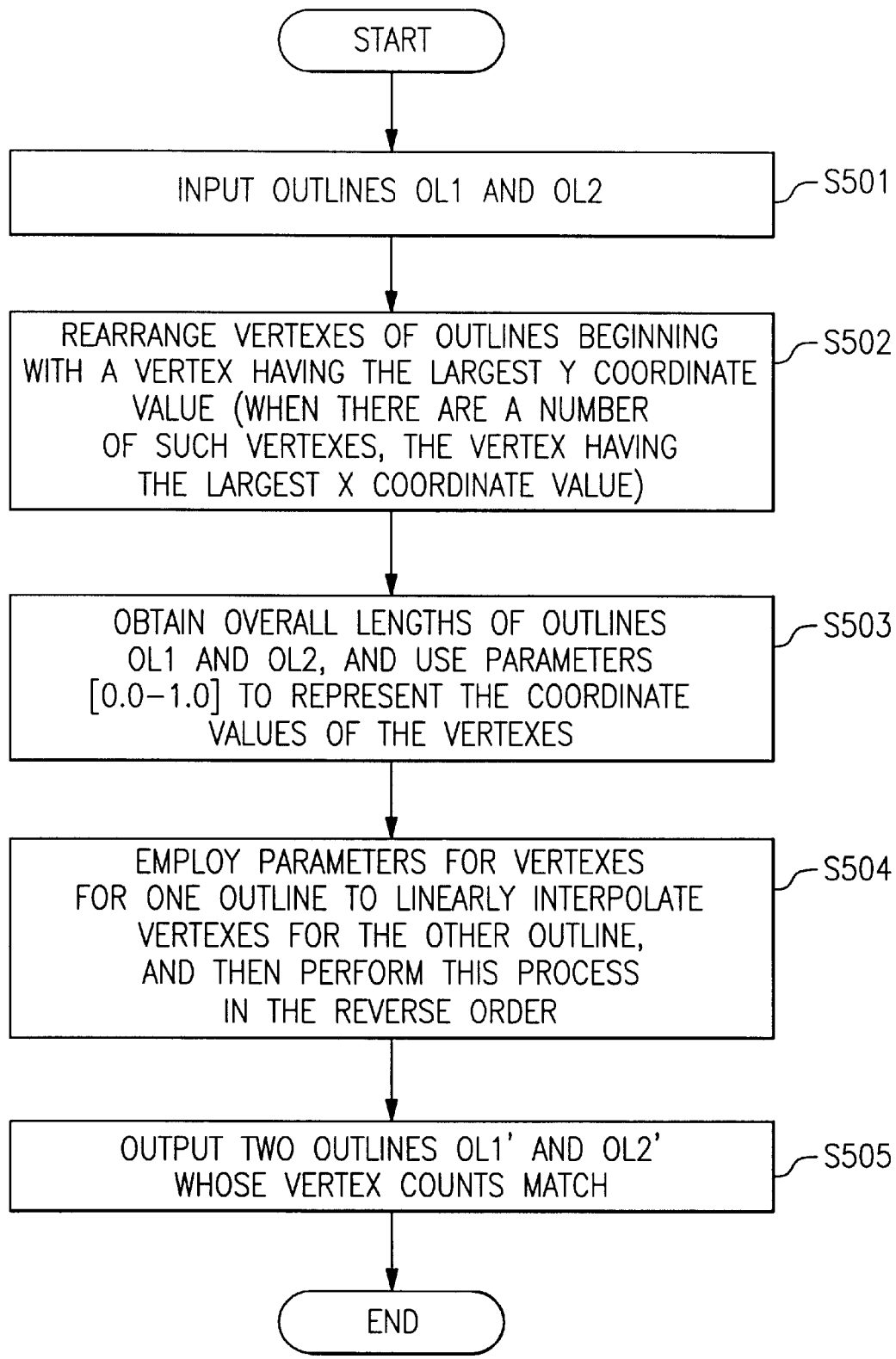
FIG. 5 is a flowchart for explaining a detailed algorithm used by a vertex adjustment unit 40.

While referring to FIG. 5, the outlines OL1 and OL2 are input (step 501), and the vertexes for each outline are rearranged, beginning with the vertex having the greatest Y coordinate value (if there are a number of such vertexes, the vertex having the greatest X coordinate value is selected) (step 502). In this embodiment, the vertexes are rearranged so that the first vertexes of the two outlines OL1 and OL2 are substantially aligned with the upper right corner of the bounding boxes. As has been described, however, in the bounding boxes, arbitrary first positions may be set. The overall length of each outline, OL1 or 0L2, is obtained, and the coordinate value of each vertex is represented by the parameter [0.0–1.0] (step 503). Then, the parameters of the vertexes for one of the outlines are employed to linearly interpolate the vertexes for the other outline. This process is also performed in reverse order (step 504). As a result, the numbers of the vertexes for the two outlines match. Then, the two outlines OL1' and OL2', whose vertex counts match, are obtained (step 505).

Figure 6:
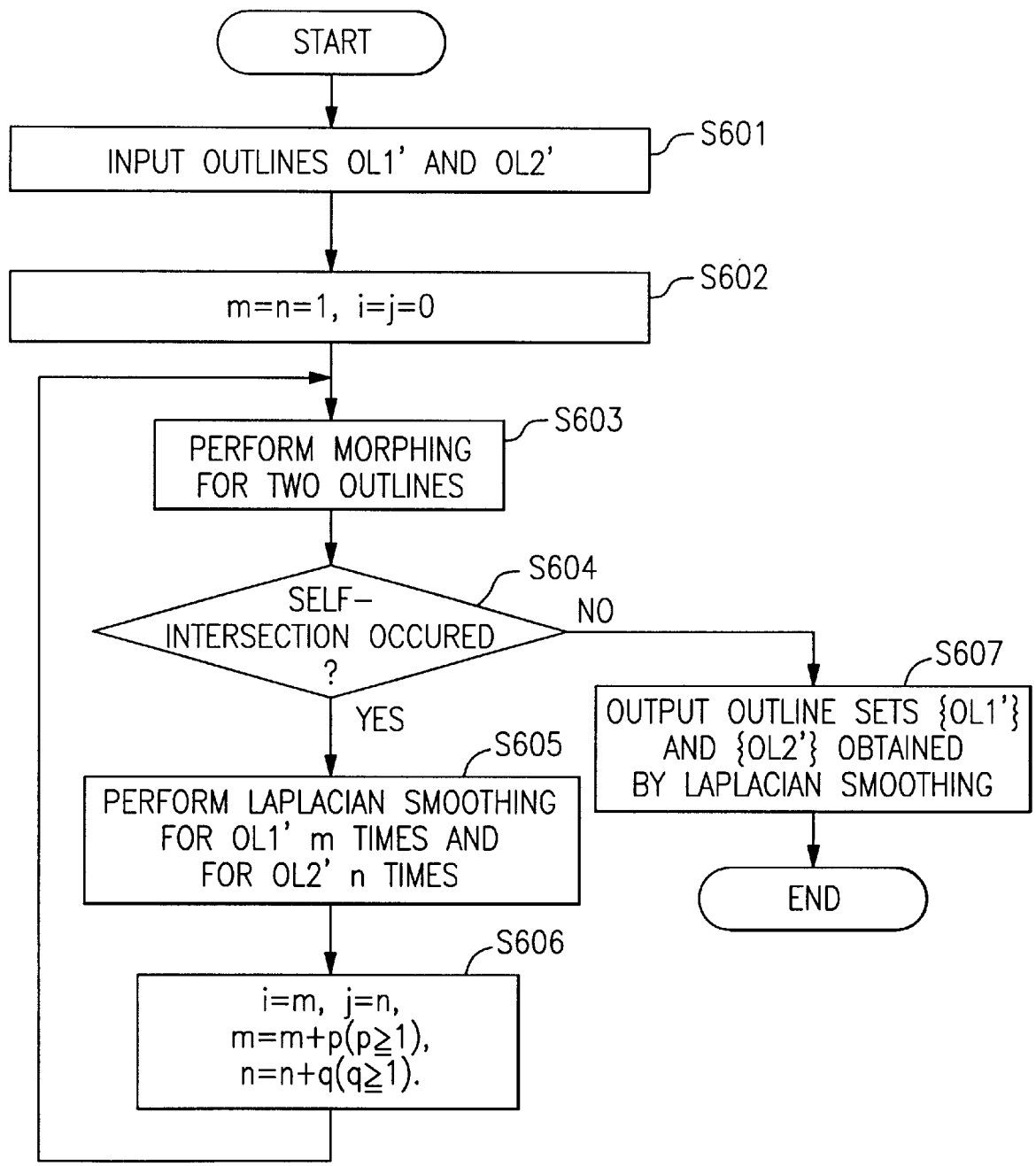
FIG. 6 is a flowchart for explaining a detailed algorithm used by an outline editor 50.

Following this, the outline editor 50 edits the outlines (step 205 in FIG. 2). At this time, a smoothing process is performed for the outlines, as needed. A detailed algorithm used by the outline editor 50 is shown in FIG. 6. For this processing, Laplacian smoothing is employed as the smoothing process.

While referring to FIG. 6, first, the outlines OL1' and OL2' are input (step 601), morphing is performed for these outlines (steps 602 and 603), and a check is performed to determine whether self-intersection has occurred (step 604). When self-intersection has occurred, the Laplacian smoothing is performed for each outline (step 605). Then, morphing is again performed for the outlines $OL1^{(i)'}$ and $OL2^{(j)'}$, which are obtained by the Laplacian smoothing (steps 606 and 603). This processing is repeated until self-intersection does not occur.

$OL1^{(i)'}$ is the outline OL1' obtained when the Laplacian smoothing has been performed i times, and $OL2^{(j)'}$ is the outline OL2' obtained when the Laplacian smoothing has been performed j times. At step 605, the parameter m indicates the Laplacian smoothing has been repeated m times for the outline $OL1^{(i)'}$, and the parameter n indicates that the Laplacian smoothing has been repeated n times for the outline $OL2^{(j)'}$. Further, for equations for updating the parameters m and n at step 606, m=m+p (p≧1) and n=n+q (q≧1), arbitrary parameters p and q can be set. Thus, when self-intersection has occurred during the morphing, the number of times the Laplacian smoothing is to be performed can be set for each outline.

When self-intersection does not occur during the morphing, the outline sets {OL1'} and {OL2'} are output that are obtained by the Laplacian smoothing performed for the outline OL1' and OL2' (steps 604 and 607). It should be noted that when the Laplacian smoothing is performed several times for the outlines OL1' and OL2', not all the outlines provided by the Laplacian smoothing need be output, and several other outlines that have been obtained may be extracted and output. Furthermore, when morphing can be performed for the input outlines OL1' and OL2' without self-intersection occurring and without the Laplacian smoothing being required (when self-intersection does not occur at the first determination at step 604), the element of the output outline set {OL1'} is only the outline $OL1^{(0)'}$ (=OL1'), and the element of the output outline set {OL2'} is only the outline $OL2^{(0)'}$ (=OL2').

Then, the sequence generator 60 generates this sequence file for the outlines during the overall transformation process (step 206 in FIG. 2). A detailed algorithm used by the sequence generator 60 is shown in FIG. 7.

Figure 7:
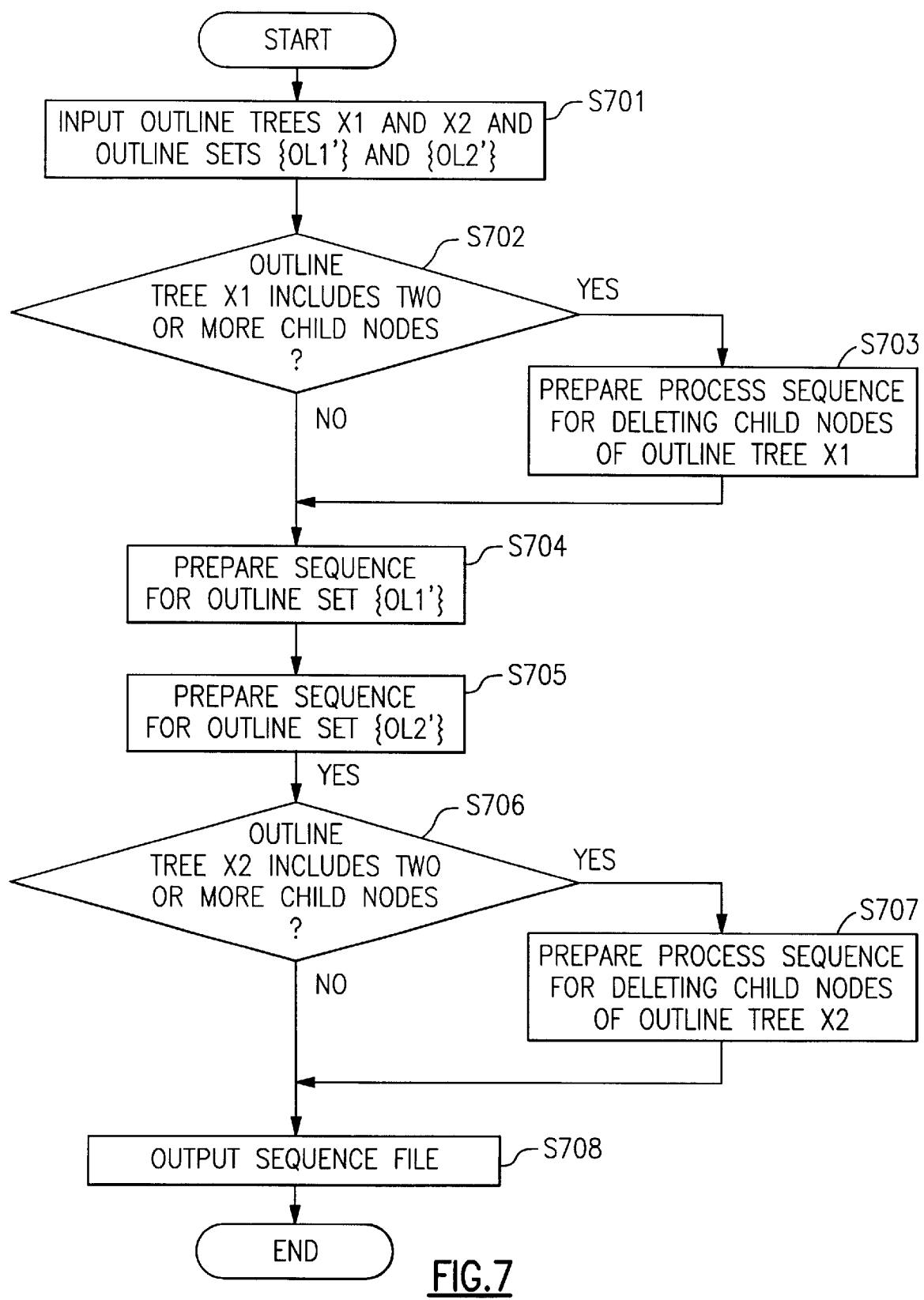
FIG. 7 is a flowchart for explaining a detailed algorithm used by a sequence generator 60.

While referring to FIG. 7, first, the outline trees X1 and X2 output by the outline tree generator 20, and the outline sets {OL1'} and {OL2'} output by the outline editor 50 are input (step 701). In this embodiment, r outlines are included in the outline set {OL1'}, and s outlines are included in the outline set {OL2'}.

Then, a check is performed to determine whether the outline tree X1 includes two or more child nodes (step 702). When the outline tree X1 includes two or more child nodes, the time $t_1$ is determined, and the child nodes are deleted for which the delete flags in FIG. 8 have been set to on between [$t_0$, $t_1$]. As a result, the sequence consisting of the pertinent outlines is prepared (step 703). Thus, for a target figure corresponding to the outline tree X1, the sequence for two outlines is prepared: the outline (corresponding to $t_0$) that was first extracted from the target figure, and the outline (corresponding to $t_1$) that corresponds to the child node that was retained by arranging the outline tree X1.

When the outline tree X1 includes only one child node (Yes, at step 702), or when at step 703 the outline tree X1 is arranged so that it has only one child node (No, at step 702), the sequence consisting of the outlines is prepared for r time parameters, $t_i$, $t_{i+1}$, . . . and $t_{i+r-1}$, in accordance with the number of elements in the outline set {OL1'} (step 704). The relationship between the time parameters is $t_i \leq t_{i+1} \leq \ldots \leq t_{i+r-1}$, and when the outline tree X1 originally includes only one child node (Yes, at step 701), i=1, while when the outline tree X1 is arranged so that it has only one child node (No, at step 701), i=2. Following this, the sequence of the outlines is prepared for s time parameters, $t_{i+r}$, $t_{i+r+1}$, . . . and $t_{i+r+s-1}$, in accordance with the number of elements of the outline set {OL2'} (step 705). The relationship between the time parameters is $t_{i+r} \leq t_{i+r+1} \leq \ldots \leq t_{i+r+s-1}$.

A check is performed to determine whether the outline tree X2 includes two or more child nodes (step 706). When the outline tree X2 includes two or more child nodes, the time $t_{1+p+q}$ is determined, and the child nodes for which the delete flags in FIG. 8 were set to on between [$t_{i+p+q}$, $t_n$] are generated, i.e., a process that is the reverse of the one used for node deleting is performed. As a result, the sequence for the pertinent outlines is prepared (step 707). It should be noted that $t_n$=1.0. For the target figure for the outline tree X2, the sequence is prepared for two outlines: the outline (corresponding to $t_{i+p+q}$) corresponding to the child node that is retained by arranging the outline X2, and the outline (corresponding to $t_n$) that is first extracted from the target figure. Through the above processing, the sequence file for the outlines along time parameters $t_0$, $t_1$, . . . and $t_n$ ($t_0 \leq t_1 \leq \ldots \leq t_n$) is prepared and output (step 708). The obtained sequence file is stored in the sequence file storage unit 70.

The morphing viewer 80 performs morphing based on the sequence file (step 207 in FIG. 2). That is, the sequence file is read from the sequence file storage unit 70 and is reproduced along the time parameters $t_0$, $t_1$, . . . and $t_n$, and a moving image among the outlines that is smoothly transformed by morphing is displayed on the display device. Thus, the state is displayed wherein the outline of the character (target figure) that corresponds to the outline tree X1 is smoothly transformed to the character (target figure) that corresponds to the outline tree X2, without an occurrence of self-intersection. When the character that corresponds to the outline tree X2 is to be transformed into the character that corresponds to the outline tree X1, the sequence file is reproduced in reverse order along the time parameters $t_n$, . . . $t_1$ and $t_0$, and a moving picture that is smoothly transformed from one outline to the other by morphing is displayed on the display device. Since the process whereby the morphing viewer 80 prepares a moving picture that is smoothly transformed from one outline to the other in the sequence file and displays it on the display device is the same as the conventional general image processing using morphing, no further explanation for this process will be given.

As is described above, according to the embodiment, the outlines of the target figure are extracted as line segments, and morphing is performed for the outlines that have been smoothed. Thus, the shape of the target figure is not limited. Further, a sampling point need not be interactively correlated with the outline of the target figure, and therefore, the method of this embodiment can be used for general purposes. Especially for a figure having a complicated shape, such as a character, the morphing can be performed without self-intersection occurring. And furthermore, if the outline of a character, such as an outline font, can be easily extracted, a character on a display device can be transformed by morphing. As a result, a visually effective document can be provided.

A specific example of an application of the embodiment will now be described.

FIG. 12 is a diagram showing the states during which, in accordance with this embodiment, character "S" is transformed into character "C." In this example, since to form the character S and the character C, for either character only a single outline is required, the outline tree arrangement unit 30 does not perform any processing. During the transformation, between 12-1 and 12-4 in FIG. 12, Laplacian smoothing is performed several times for the character S, and between 12-8 and 12-6, Laplacian smoothing is performed several times for the character C. On an actual display, the transformation states from 12-1 to 12-8, and the transformation states from 12-8 to 12-1, which is the reverse process, are displayed as a moving picture that moves smoothly between these states.

FIG. 13 is a diagram showing the states during which character "B" is transformed into character "A" in accordance with this embodiment. 13-1 and 13-2 show the states where the outline that corresponds to the largest bounding box for the character B, i.e., the outermost outline, is retained and the other outlines are deleted. Then, 13-3 and 13-4 show the states where Laplacian smoothing is performed for the remaining outermost outline. Similarly, 13-7 and 13-8 show the reverse transformation processing for retaining the outermost outline of the character A and deleting the other outlines, and 13-5 and 13-6 show the reverse transformation processing for the performance of Laplacian smoothing for the remaining outermost outline. On an actual display, the transformation from 13-1 to 13-8 and the transformation from 13-8 to 13-1, which is the reverse process, are presented as a moving picture that moves smoothly between these states.

Figure 14:
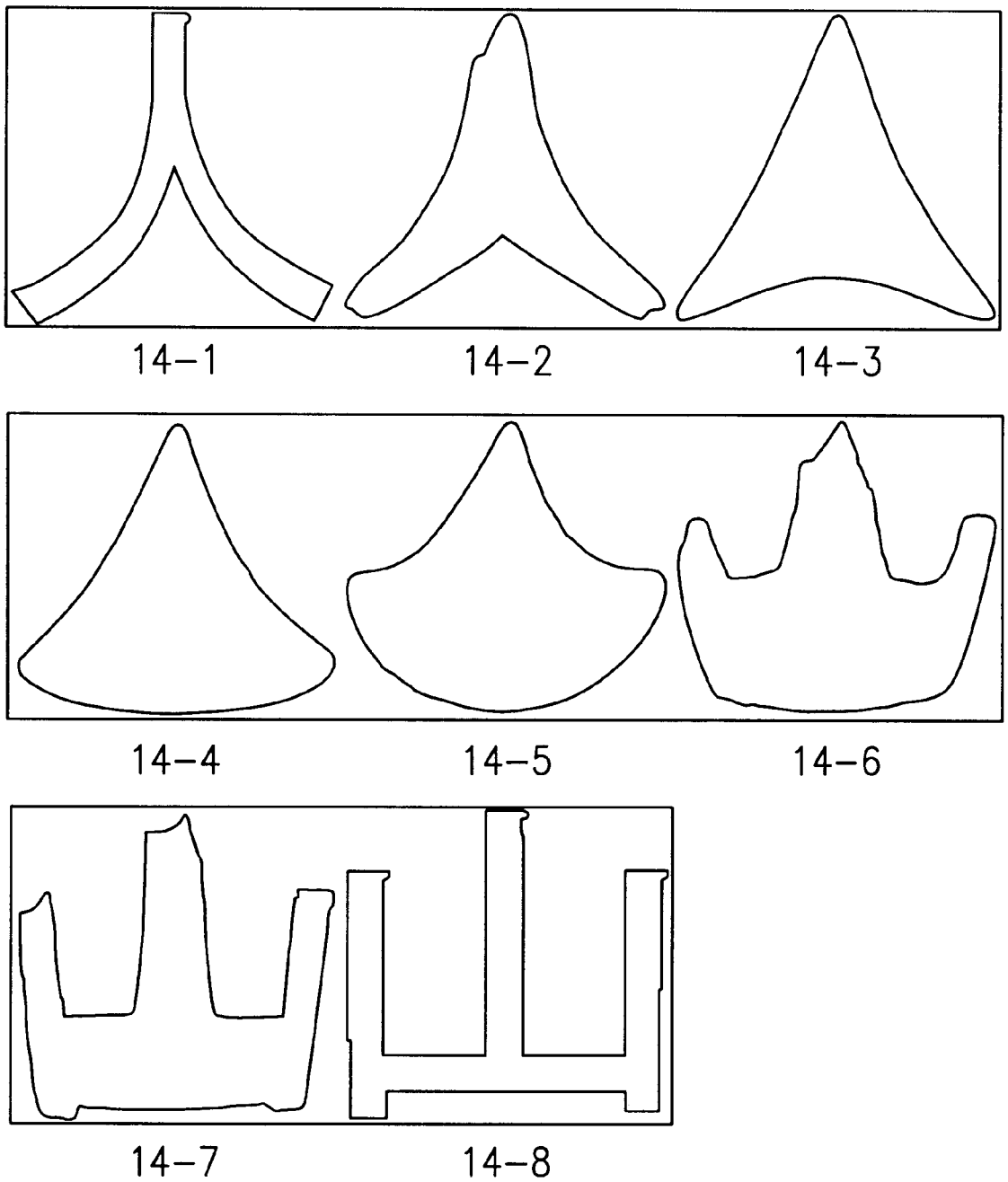
FIG. 14 is a diagram for explaining the process for transforming a Chinese or other character into another Chinese character.

FIG. 14 is a diagram showing the states during which one Chinese or other character is transformed into another character. In this example, since to form for either character only a single outline is required, the outline tree arrangement unit 30 does not perform any processing. Between 14-1 and 14-3 in FIG. 14, Laplacian smoothing is performed several times for the initial character, and between 14-8 and 14-4, Laplacian smoothing is performed several times for the resultant character. On an actual display, the transformation states from 14-1 to 14-8, and the transformation states from 14-8 to 14-1, which is the reverse process, are presented as a transitioning image that moves smoothly between these states.

FIG. 15 is a diagram showing the states during which a different character is transformed. Between 15-1 and 15-4 are shown the states wherein the outlines correspond to the largest bounding box for the initial character is retained and the other outlines are deleted. In this case, the upper half of the initial character is retained and the lower half is deleted. Further, 15-5 and 15-6 show the states during which Laplacian smoothing is performed for the remaining outermost outline. Similarly, 15-10 to 15-12 show the reverse processing performed for retaining the outermost outline of the character and for deleting the other outlines. Then, 15-7 to 15-9 show the reverse process during which Laplacian smoothing is performed for the outline of the remaining radical portion (state 15-10). On an actual display, the transformation from 15-1 to 15-12 and the transformation from 15-12 to 15-1, which is the reverse process, are presented as a transitioning image that moves smoothly between these states.

Figure 16:
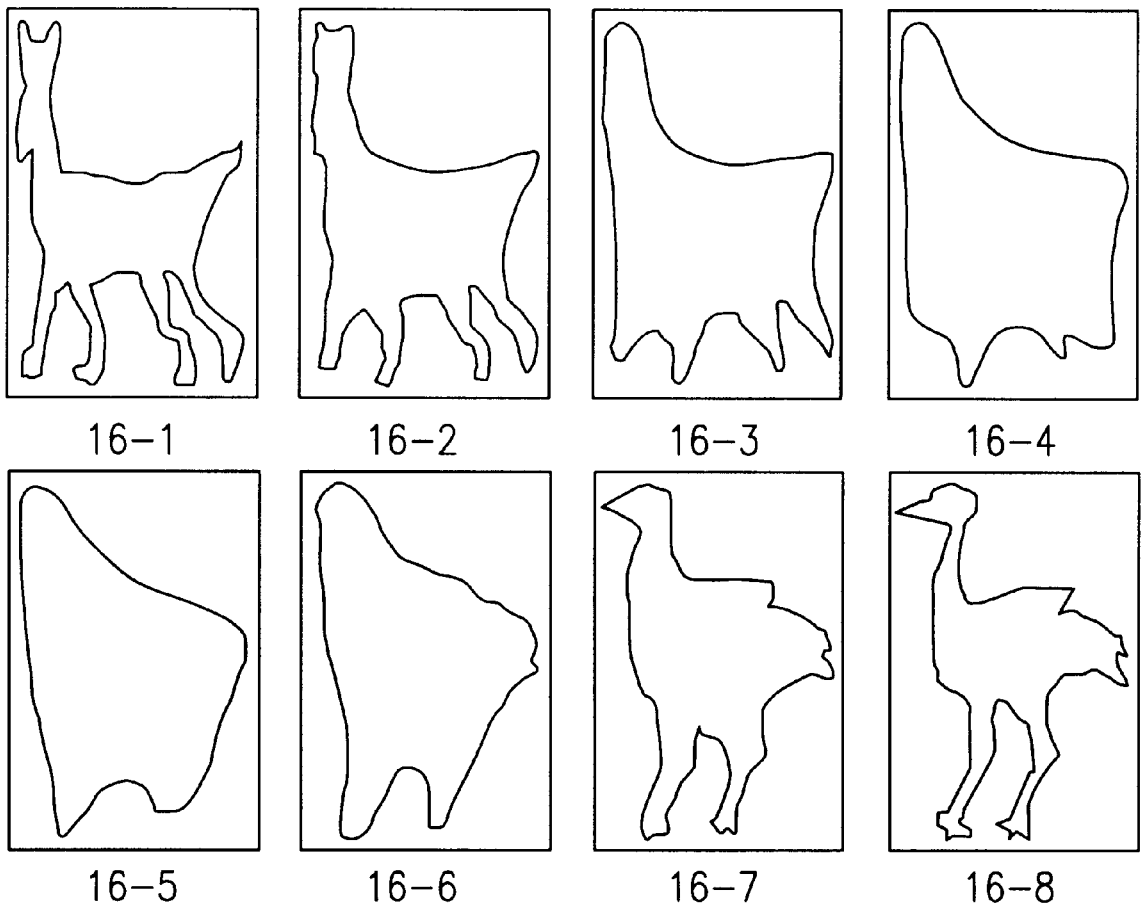
FIG. 16 is a diagram for explaining the process for transforming an outline that is shaped like a dog into an outline that is shaped like a bird.

FIG. 16 is a diagram showing an example where the embodiment is applied not for a font but for a general closed curve. In this example, a figure (an outline) having the shape of a dog is transformed into a figure (an outline) having the shape of a bird. In this example, since to form the two figures, for either figure only a single outline is required, the outline tree arrangement unit 30 does not perform any processing. In FIG. 16, between 16-1 and 16-4 Laplacian smoothing is performed several times for the outline shaped like a dog, and between 16-8 and 16-5 Laplacian smoothing is performed several times for the outline shaped like a bird. On an actual display, the transformation states from 16-1 to 16-8, and the transformation states from 16-8 to 16-1, which is the reverse process, are presented as a transitioning image that moves smoothly between these states.

In the above processing and the examples, two target figures are correlated with each other, and one figure is transformed into the other. In this embodiment, however, m characters can be transformed into n characters while the m characters are correlated with the n characters. In this case, a character string consisting of m characters as elements and a character string consisting of n characters as elements are input, and each character element corresponds to another. Since each character string consists of an arbitrary m characters or an arbitrary n characters, the number of characters in the two character strings may differ. In this case, circles that are not presented on the display device are added to the shorter character string, in a number equivalent to the number of characters the string is short, so that the circles are correlated with the extra characters of the other character string. Then, morphing is performed for the corresponding elements in the same manner as for the one-to-one corresponding figure. As a result, one character string can be smoothly transformed into the other character string.

The transformation from the character to the circle that is not displayed on the display device is performed in the same manner as the transformation of common characters. It should be noted, however, that Laplacian smoothing need not be performed for the circles. In addition, when the vertex adjustment unit 40 adds to a pertinent circle a point that corresponds to a vertex on the outline of a character (target figure), the coordinates of the point are obtained as follows. A parameter θ in equation 4 is set as a parameter that corresponds to the parameter p for specifying the vertex on the outline of the character.

$$\theta = p \times 2 \times \pi \qquad \text{[Equation 4]}$$

When the coordinates (xp, yp), of the point in the circle that corresponds to the vertex that is specified by the parameter p, are obtained from equation 5, the radius of the circle is defined as r and the center coordinates are defined as (x0, y0).

$$xp = x0 + r \times \sin\theta \qquad \text{[Equation 5]}$$
$$yp = y0 + r \times \cos\theta$$

Since in this manner the point provided on the circle is correlated with the vertex of the outline of the character, the morphing can be performed.

On an actual display, one character is transformed into the other at a portion where the characters are correlated with each other. Further, at a portion where the character is correlated with a circle that is not displayed on the display device, the character is gradually reduced and disappears, or a character appears in a space wherein nothing is displayed. This is visually the same as the example where one outline is retained for a character that consists of multiple outlines, and the other outlines are deleted (see FIGS. 13 and 15). In the above example, character strings, each of which consists of multiple characters, are transformed by morphing. However, a string of figures that, as elements, consists of arbitrary figures other than characters can be employed as a target.

In the above processing and the examples, morphing is performed for a two-dimensional figure. However, the embodiment can be applied for a three-dimensional image. That is, an approximation can be performed for a three-dimensional image by using polygons, while the surface is represented by line segments. Then, the smoothing process of this embodiment can be performed for the resultant image, so that morphing can be performed without self-intersection occurring.

As is described above, according to the present invention, image processing using morphing can be performed in a vector space for the outlines of various types and shapes of figures. Specifically, morphing can even be performed for a figure that consists of a plurality of outlines. Further, morphing can also be performed for a figure having raised and recessed portions, while the occurrence of self-intersection is prevented.

Figure 17:
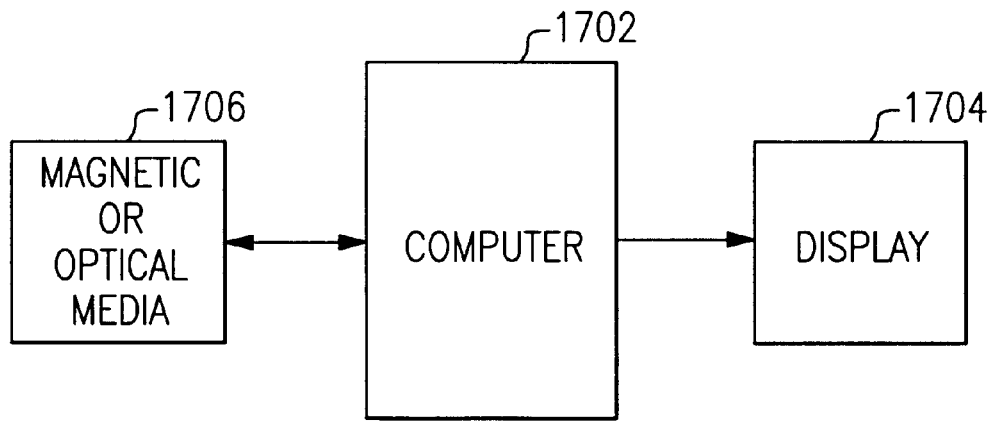
FIG. 17 shows a block diagram of a computer system for use with the present invention.

In addition, morphing can be performed for a character or a character string presented on the display device of a computer. As shown in FIG. 17, the software algorithms described can be provided to the computer 1702 containing the display 1704 on magnetic or optical media 1706. Resultant images can also be provided on magnetic media 1706 or film.

The foregoing discussion discloses and describes exemplary embodiments of the present invention. One skilled in the art will readily recognize from such discussion, and from the accompanying drawings and claims, that various changes, modifications and variations can be made therein. Therefore, it should be understood that the present invention is not limited to those embodiments but all embodiments within the spirit and scope of the invention as defined in the following claims.

I claim:

1. A morphing processing apparatus, which performs a morphing process for the smooth transformation of one figure into another, comprising:

an outline extractor, for receiving two target figures for said morphing process and for extracting a set of outlines for each of said target figures;

an outline arrangement unit, for retaining one specific outline of each of said two sets of outlines extracted for said target figures and for deleting the other outlines;

a smoothing processor, for performing a smoothing process for the two outlines for said target figures that are retained by said outline arrangement unit in order to prevent self-intersection during said morphing process; and a morphing execution unit, for performing said morphing process in response to the progress made by said smoothing process performed by said smoothing processor.

2. The morphing processing apparatus according to claim 1, wherein said outline arrangement unit includes:

an outline tree generator, for generating an outline tree having nodes that correspond to said outlines that are extracted for said two target figures by said outline extractor and that reflect the relationship of said outlines; and an outline tree arrangement unit, for retaining only one specific node, of those nodes of said outline tree that are generated by said outline tree generator, for each of said figures and for deleting the other nodes in accordance with a predetermined rule, wherein said smoothing processor performs said smoothing process for each outline that corresponds to one of said nodes that are retained as a result of the process performed by said outline arrangement unit.

3. The morphing processing apparatus according to claim 2, wherein said outline tree generator receives said outlines of said target figures that are extracted by said outline extractor, designates, for each of said outlines, a bounding box that encloses the pertinent outline, and generates an outline tree based on the relationship existing between said bounding boxes.

4. The morphing processing apparatus according to claim 1, wherein, when a curve is included in said outlines of said target figures, said outline extractor divides said curve into line segments and performs segment approximation.

5. The morphing processing apparatus according to claim 1, including a font file wherein said outline extractor receives from the font file, as a target figure, an outline font character and extracts the outline of said character.

6. The morphing processing apparatus according to claim 1, wherein, as a target figure for the extraction of an outline, said outline extractor normally receives a true type font character.

7. The morphing processing apparatus according to claim 1, wherein, as said smoothing process, said smoothing processor performs Laplacian smoothing for the outline.

8. The morphing processing apparatus according to claim 1, wherein said morphing execution unit includes:

a sequence generator for generating a sequence file in which said outlines obtained by said smoothing processor are arranged along a time parameter; and a morphing execution section for performing morphing based on said sequence file obtained by said sequence generator.

9. A morphing method, for smoothly transforming two figures from one to the other by morphing, comprising:

an outline extraction step of extracting, as line segments, outlines of two target figures for a morphing process;

an outline tree generation step of generating an outline that has nodes corresponding to said outlines extracted for each of said target figures, and that reflects the relationship of said outlines;

a node deleting step of retaining one specific node from among said nodes of said outline tree generated for each of said target figures, and deleting the other nodes;

a vertex count matching step of matching the number of vertexes of two outlines that correspond to said nodes that are respectively retained in said outline trees for said two target figures;

a smoothing step of performing a smoothing process for said two outlines for which the number of vertexes match, so that self-intersection does not occur during said morphing process;

a sequence file generation step of generating a sequence file along a time parameter for the outlines obtained in said smoothing process; and a morphing step of performing morphing based on said sequence file, and of displaying the outlines one after the other in the time sequence in the sequence file operation step.

10. The morphing method according to claim 9, wherein said outline tree generation step includes the steps of:

designating, for each of said outlines that constitute said target figures, a bounding box that encloses the pertinent outline;

generating a bounding box that can enclose each of said target figures, and generating a root node of said outline tree that corresponds to said bounding box; and selecting one of said bounding boxes respectively generated for said outlines, generating a child node that corresponds to said outline of said selected bounding box, and inserting said child node under said root node. Said step of inserting said child node includes the step of:

recurrently inserting said child node under said different node when said bounding box that encloses an outline that corresponds to a predetermined child node is completely included in a bonding box that encloses an outline corresponding to a different child node that has already been inserted under said root node.

11. The morphing method according to claim 9, wherein said node deleting step includes the steps of:

determining a node to be retained in accordance with said predetermined rule; and moving, to one arbitrary point, vertexes of said outlines that correspond to the other nodes, and regarding said point as a point that is not finally displayed.

12. The morphing method according to claim 9, wherein said vertex count matching step includes the steps of:

arranging vertexes of two outlines beginning at a specific position and extending around said two outlines in a constant direction;

employing a parameter whose value falls within a constant range to represent coordinates of said vertexes that are rearranged; and comparing said parameters of said vertexes along said two outlines, and mutually employing said parameters of said vertexes for one of said outlines to linearly interpolate said vertexes with the other outline.

13. The morphing method according to claim 12, wherein, at said step of employing said parameters of said vertexes to perform linear interpolation for said vertexes of said two outlines, points that correspond to said vertexes of one of said outlines are added to the other outline, and vice versa.

14. The morphing method according to claim 9, wherein, at said smoothing step, the Laplacian smoothing is repeated for said outlines an arbitrary number of times, and, when during morphing self-intersection does not occur, the Laplacian smoothing is halted.

15. The morphing method according to claim 9, wherein said smoothing step includes the steps of:
- performing a trial morphing for two outlines for which the number of vertexes match, and for confirming the occurrence or nonoccurrence of self-intersection; and
- repeating the Laplacian smoothing for said two outlines an arbitrary number of times when self-intersection occurs as a result of said trial morphing, and
- wherein said smoothing step recurrently repeats said two steps until self-intersection does not occur, even when said trail morphing is performed.

16. A computer program in a computer readable storage medium for performing a morphing process, the computer program comprising: a process for inputting two target figures for morphing;
- software for extracting, as line segments, outlines of said two target figures;
- software for generating an outline tree that has nodes corresponding to said outlines extracted for each of said target figures, and that reflects the relationship of said outlines;
- software for retaining one specific node from among said nodes of said outline tree generated for each of said target figures, and deleting the other nodes;
- software for matching the number of vertexes of two outlines that correspond to said nodes that are respectively retained in said outline trees for said two target figures;
- software for performing a smoothing process for said two outlines for which the number of vertexes match, so that self-intersection does not occur during said morphing process;
- software for generating a sequence file along a time parameter for the outlines obtained in said smoothing process; and
- software for performing morphing based on said sequence file, and of displaying the results.

17. A program transmission apparatus containing storage means, for storing a program to permit a computer to perform and transmission means for reading said program from said and transmitting said program to said computer for performing the method of:
- a process for inputting two target figures for morphing,
- a process for extracting, as line segments, outlines of said two target figures,
- a process for generating an outline tree that has nodes corresponding to said outlines extracted for each of said target figures, and that reflects the relationship of said outlines,
- a process for retaining one specific node from among said nodes of said outline tree generated for each of said target figures, and deleting the other nodes,
- a process for matching the number of vertexes of two outlines that correspond to said nodes that are respectively retained in said outline trees for said two target figures,
- a process for performing a smoothing process for said two outlines for which the number of vertexes match, so that self-intersection does not occur during said morphing process,
- a process for generating a sequence file along a time parameter for the outlines obtained in said smoothing process, and
- a process for performing morphing based on said sequence file, and of displaying the results; and
- transmission means for reading said program from said storage means and for transmitting said program.

18. A morphing processing apparatus comprising:
- a calculator; and
- a display device for displaying the results obtained by said calculator,
- wherein said calculator receives, as targets, a figure string consisting of m arbitrary figures as elements and a figure string consisting of n arbitrary figures as elements, and correlates said elements of said two figure strings with each other,
- wherein, when the numbers of said elements of said two figure strings do not match, said calculator adds, to said figure string whose element is the shortest, circles that are not displayed on said display device and that are equivalent in number to said shortest elements, so that said circles correspond to extra elements of the other figure string, and
- wherein said calculator performs morphing for said elements that are correlated with each other, so as to smoothly transform one figure string into the other figure string.

19. A morphing processing apparatus, which performs a morphing process for the smooth transformation of one character into another, comprising:
- an outline extractor, for receiving two target characters for said morphing process and for extracting a set of outlines for each of said target characters;
- an outline arrangement unit, for retaining one specific outline of each of said two sets of outlines extracted for said target characters and for deleting the other outlines;
- a smoothing processor, for performing a smoothing process for the two outlines for said target characters that are retained by said outline arrangement unit in order to prevent self-intersection during said morphing process; and
- a morphing execution unit, for performing said morphing process in a timed sequence of intermediate shapes to blend one character into the other in response to the progress made by said smoothing process performed by said smoothing processor.

20. A morphing processing apparatus, which performs a morphing process for the smooth transformation of one font character into another, comprising:
- an outline extractor, for receiving two target font characters for a morphing process and for extracting a set of outlines for each of said target fonts;
- an outline arrangement unit, for retaining one specific outline of each of said two sets of outlines extracted for said target font characters and for deleting the other outlines;
- a smoothing processor, for performing a smoothing process for the two outlines for said target font characters that are retained by said outline arrangement unit in order to prevent self-intersection during said morphing process; and
- a morphing execution unit, for performing said morphing process in response to the progress made by said smoothing process performed by said smoothing processor.

21. A morphing processing apparatus, which smoothly transforms one figure into another one, comprising:
- an outline arrangement unit for receiving sets of outlines that respectively constitute two target figures for a morphing process, and for retaining a specific outline selected from each of said sets of outlines for said target figures and for deleting the other outlines;

a smoothing processor, for performing a smoothing process for the two outlines for said target figures that are retained by said outline arrangement unit in order to prevent self-intersection during said morphing process; and a morphing execution unit, for performing said morphing process through a plurality of intermediate outlines differing from that of both target figures in response to the progress made by said smoothing process performed by said smoothing processor.

22. An animation creation apparatus, which creates an animated sequence wherein one figure is smoothly transformed into another, comprising:

an outline extractor, for receiving two target figures for said morphing process and for extracting a set of outlines for each of said target figures;

an outline arrangement unit, for retaining one specific outline of each of said two sets of outlines extracted for said target figures and for deleting the other outlines;

a smoothing processor, for performing a smoothing process for the two outlines for said target figures that are retained by said outline arrangement unit in order to prevent self-intersection when one outline is transformed to the other; and an image processor, for creating an animated sequence wherein one figure is smoothly transformed into another in response to the progress made by said smoothing process performed by said smoothing processor.

* * * * *